(12) United States Patent
Maeda et al.

(10) Patent No.: US 10,735,260 B2
(45) Date of Patent: Aug. 4, 2020

(54) GATEWAY DEVICE, FIRMWARE UPDATE METHOD, AND RECORDING MEDIUM

(71) Applicant: Panasonic Intellectual Property Corporation of America, Torrance, CA (US)

(72) Inventors: Manabu Maeda, Osaka (JP); Hideki Matsushima, Osaka (JP); Tomoyuki Haga, Nara (JP); Yoshihiro Ujiie, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 183 days.

(21) Appl. No.: 15/878,787

(22) Filed: Jan. 24, 2018

(65) Prior Publication Data
US 2018/0152341 A1 May 31, 2018

Related U.S. Application Data

(63) Continuation of application No. PCT/JP2016/003082, filed on Jun. 27, 2016.
(Continued)

(30) Foreign Application Priority Data

May 31, 2016 (JP) .................................. 2016-109537

(51) Int. Cl.
*H04L 12/24* (2006.01)
*B60R 16/023* (2006.01)
(Continued)

(52) U.S. Cl.
CPC ............ *H04L 41/082* (2013.01); *B60R 16/02* (2013.01); *B60R 16/023* (2013.01); *G06F 8/654* (2018.02);
(Continued)

(58) Field of Classification Search
CPC . H04L 41/082; H04L 12/40013; H04L 12/66; H04L 12/4625; H04L 12/40169;
(Continued)

(56) References Cited

U.S. PATENT DOCUMENTS

2005/0071838 A1 3/2005 Hatasaki
2005/0216902 A1* 9/2005 Schaefer .................. G06F 8/61
717/168
(Continued)

FOREIGN PATENT DOCUMENTS

| JP | 2005-107803 | 4/2005 |
|----|-------------|--------|
| JP | 2010-273181 | 12/2010 |
| JP | 2015-103163 | 6/2015 |

OTHER PUBLICATIONS

The Extended European Search Report dated Oct. 15, 2018 for the related European Patent Application No. 16845861.0.
(Continued)

*Primary Examiner* — Azizul Choudhury
(74) *Attorney, Agent, or Firm* — Greenblum & Bernstein, P.L.C.

(57) ABSTRACT

A gateway connected to a bus used for communication by a plurality of ECUs provided on-board a vehicle is provided with: an external communication unit that receives, from a server external to the vehicle, firmware update information that includes updated firmware for one ECU from among the plurality of ECUs; an ECU information acquiring unit that acquires system configuration information indicating the type of each of the plurality of ECUs connected to the bus;
(Continued)

and a FW update processing unit that performs a controlling operation to update firmware of the relevant ECU based on the updated firmware, after an operation verification of the updated firmware is performed using an ECU of each type indicated by the system configuration information.

13 Claims, 22 Drawing Sheets

Related U.S. Application Data

(60) Provisional application No. 62/218,074, filed on Sep. 14, 2015.

(51) Int. Cl.
| | |
|---|---|
| *G06F 11/00* | (2006.01) |
| *B60R 16/02* | (2006.01) |
| *G06F 11/36* | (2006.01) |
| *G06F 8/654* | (2018.01) |
| *G06F 8/71* | (2018.01) |
| *H04L 12/46* | (2006.01) |
| *H04L 12/40* | (2006.01) |
| *H04L 12/66* | (2006.01) |

(52) U.S. Cl.
CPC ............... *G06F 8/71* (2013.01); *G06F 11/00* (2013.01); *G06F 11/3668* (2013.01); *H04L 12/40013* (2013.01); *H04L 12/40169* (2013.01); *H04L 12/4625* (2013.01); *H04L 12/66* (2013.01); *G06F 11/3664* (2013.01); *G06F 11/3696* (2013.01); *H04L 2012/40273* (2013.01)

(58) Field of Classification Search
CPC . H04L 2012/40273; G06F 8/71; G06F 8/654; G06F 11/00; G06F 11/3668; G06F 11/3664; G06F 11/3696; B60R 16/02; B60R 16/023
See application file for complete search history.

(56) References Cited

U.S. PATENT DOCUMENTS

| | | | |
|---|---|---|---|
| 2015/0277942 A1* | 10/2015 | Rork | .......................... G06F 8/65 701/31.4 |
| 2016/0188315 A1* | 6/2016 | Mere | ....................... G06F 8/654 717/170 |

OTHER PUBLICATIONS

International Search Report of PCT application No. PCT/JP2016/003082 dated Sep. 13, 2016.

* cited by examiner

FIG. 4

| ACCEPTED ID LIST |
|---|
| 1 |
| 2 |
| 3 |
| 4 |

FIG. 5

| FORWARDING SOURCE | FORWARDING DESTINATION | ID |
|---|---|---|
| 200a | 200b | * |
| 200b | 200a | 3 |

FIG. 6

| ECU-ID | ECU CLASS | MANUFACTURING COMPANY | FW VERSION |
|---|---|---|---|
| 0001 | ENGINE | A CORP. | 1.0 |
| 0002 | BRAKE | B CORP. | 1.0 |
| 0003 | DOOR | C CORP. | 1.0 |
| 0004 | WINDOW | D CORP. | 1.0 |

FIG. 9

| VEHICLE ID | ECU-ID | ECU CLASS | MANUFACTURING COMPANY | FW VERSION | LATEST FW VERSION |
|---|---|---|---|---|---|
| VEHICLE A | 0001 | ENGINE | A CORP. | 1.0 | 1.0 |
| VEHICLE A | 0002 | BRAKE | B CORP. | 1.0 | 1.0 |
| VEHICLE A | 0003 | DOOR | C CORP. | 1.0 | 1.0 |
| VEHICLE A | 0004 | WINDOW | D CORP. | 1.0 | 2.0 |

| ECU-ID | ECU CLASS | Ver | VEHICLE MODEL |
|---|---|---|---|
| 0001 | ECU 100a | 1.4 | AB01, AC30, ... |
| 0002 | ECU 100b | 3.0 | AB01, ... |
| 0003 | ECU 100c | 2.1 | AC30, BC22, CC52, ... |
| 0004 | ECU 100d | 1.0 | RBS6, SRW2, ... |

| VEHICLE MODEL | ECU-ID |
|---|---|
| AB01 | 0001, 0002, ... |
| AC30 | 0002, 0003, ... |
| BC22 | 0003, ... |
| CC52 | 0003, ... |
| RBS6 | 0004, ... |
| SRS2 | 0004, ... |

GATEWAY DEVICE, FIRMWARE UPDATE METHOD, AND RECORDING MEDIUM

BACKGROUND

1. Technical Field

The present disclosure relates to technology that updates firmware in an electronic control unit that communicates on an on-board network.

2. Description of the Related Art

Recently, in systems inside automobiles, devices called electronic control units (ECUs) are being disposed in large numbers. A network joining these ECUs is called an on-board network. Various standards exist for on-board networks. One of the most prevalent on-board network standards is called a controller area network (CAN) prescribed in ISO 11898-1.

In a CAN, communication links are formed using two buses, and an ECU connected to a bus is called a node. Each node connected to a bus transmits and receives messages called frames. In addition, in a CAN, identifiers that indicate the destination and the source of a transmission do not exist, and instead, the transmitting node transmits (in other words, sends out signals on the buses) while attaching an ID called a message ID to each frame, while each receiving node receives (in other words, reads signals from the buses) only a predetermined message ID.

When many ECUs are operating in conjunction with each other by exchanging messages via buses, if an ECU starts updating its firmware, there is a possibility of affecting the running of the automobile, due to factors such as the ECU being unable to exchange messages during the update. Regarding this point, there is known a technology that updates firmware only in a case of determining, from information indicating the state of the automobile, that the firmware of the ECU may be updated, such as while the automobile is stopped (see Japanese Unexamined Patent Application Publication No. 2010-273181).

SUMMARY

However, in the above technology of the related art, further improvement is necessary.

In one general aspect, the techniques disclosed here feature a gateway device connected to a bus used in communication by a plurality of electronic control units provided on-board a vehicle, the gateway device comprising: processing circuitry; and storage including at least one set of instructions that, when executed by the processing circuitry, cause the processing circuitry to perform operations including receiving, from an external device external to the vehicle, firmware update information that includes updated firmware for one electronic control unit from among the plurality of electronic control units, acquiring system configuration information indicating a type of each of the plurality of electronic control units connected to the bus, and performing a controlling operation to update firmware of the relevant electronic control unit on a basis of the updated firmware, after an operation verification of the updated firmware is performed using an electronic control unit of each type indicated by the system configuration information.

According to the above aspect, further improvements may be realized.

It should be noted that general or specific embodiments may be implemented as a device, system, integrated circuit, computer program, or computer-readable recording medium such as a CD-ROM disc, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of an accepted ID list;

FIG. 5 is a diagram illustrating an example of forwarding rules used by a gateway;

FIG. 6 is a diagram illustrating an example of a list of system configuration information (list of ECU information) according to Embodiment 1;

FIG. 9 is a diagram illustrating an example of vehicle ECU management information stored by a server;

Figure 1:
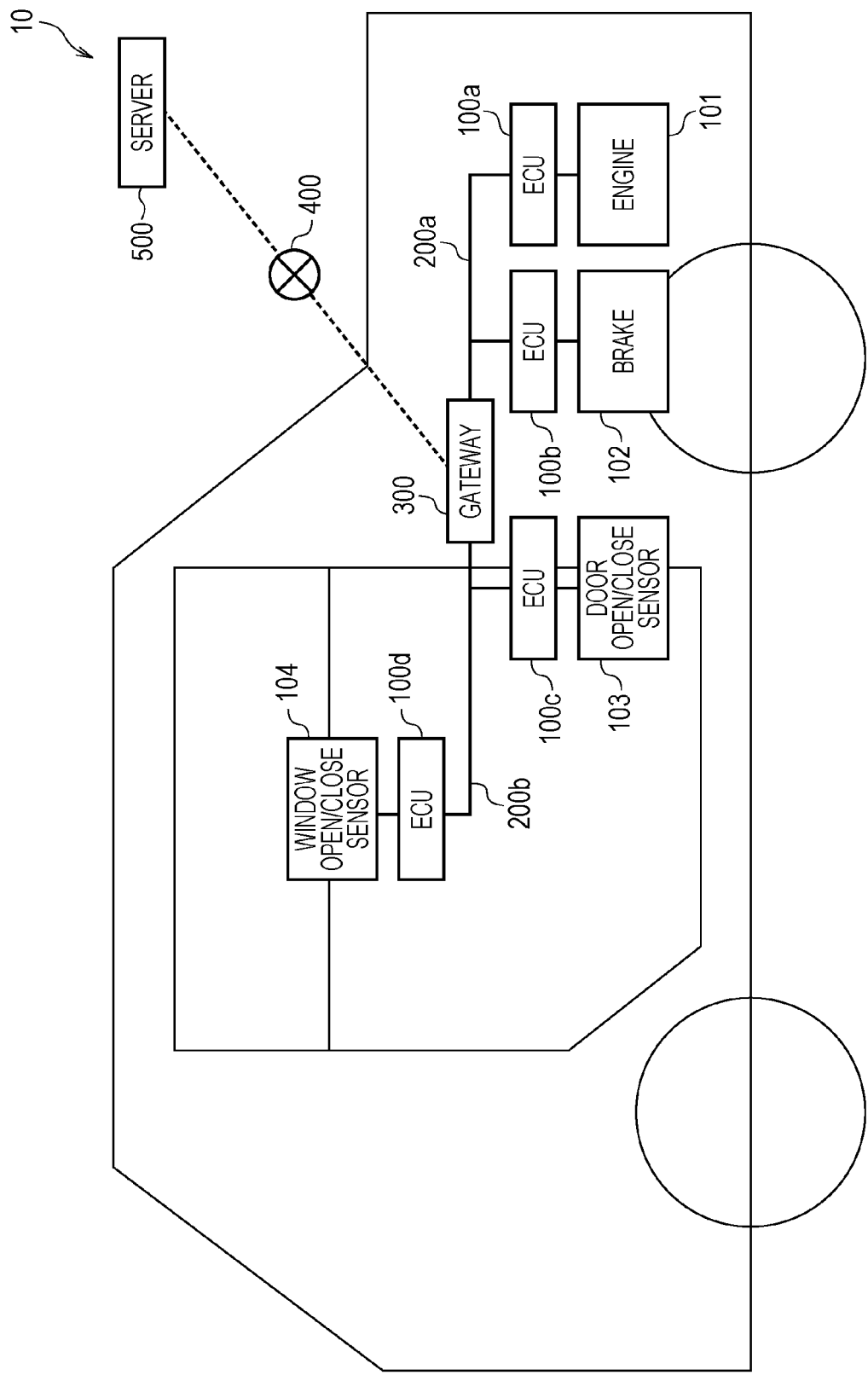
FIG. 1 is a diagram illustrating an overall configuration of an on-board network system according to Embodiment 1.

DETAILED DESCRIPTION (Underlying Knowledge Forming Basis of the Present Disclosure)

The technology of Japanese Unexamined Patent Application Publication No. 2010-273181 executes a firmware update at a suitable (for example, a safe) timing, but does not keep a vehicle such as an automobile from functioning incorrectly after the firmware update.

In light of the above investigation, the inventor investigated the following improvements to address the above issue.

A gateway device according to one aspect of the present disclosure is a gateway device connected to a bus used in communication by a plurality of electronic control units provided on-board a vehicle, the gateway device comprising: processing circuitry; and storage including at least one set of instructions that, when executed by the processing circuitry, cause the processing circuitry to perform operations including receiving, from an external device external to the vehicle, firmware update information that includes updated firmware for one electronic control unit from among the plurality of electronic control units; acquiring system configuration information indicating a type of each of the plurality of electronic control units connected to the bus, and performing a controlling operation to update firmware of the relevant electronic control unit on a basis of the updated firmware, after an operation verification of the updated firmware is performed using an electronic control unit of each type indicated by the system configuration information.

With this arrangement, when updating firmware an update control is conducted with respect to multiple electronic control units after ensuring the implementation of an operation verification of the updated firmware, thereby reducing the possibility of the vehicle ceasing to function correctly after updating the firmware compared to a case in which an operation verification is not conducted.

A configuration is also possible in which the firmware update information includes verified configuration information indicating the type of each of the plurality of electronic control units used in the operation verification of the updated firmware, and the controlling operation includes comparing the type of each of the plurality of electronic control units provided on-board the vehicle as indicated by the system configuration information to the type of each of the plurality of electronic control units used in the operation verification as indicated by the verified configuration information, and performing an update based on the updated firmware if a result of the comparison satisfies a first condition. With this arrangement, it is possible to confirm whether or not a valid operation verification has been executed with respect to the configuration of an on-board network (the organization of an electronic control unit group) in a vehicle provided with a gateway device, thereby making it possible to ensure the implementation of an appropriate operation verification.

A configuration is also possible in which the type of each of the plurality of electronic control units connected to the bus as indicated by the system configuration information identifies a version of firmware implemented in each electronic control unit, and the type of each of the plurality of electronic control units used in the operation verification of the updated firmware as indicated by the verified configuration information identifies a version of firmware implemented in each electronic control unit. With this arrangement, it is possible to confirm whether or not an operation verification has been performed in an operating environment implementing firmware of the same version as the firmware of each electronic control unit connected to an on-board network, thereby making it possible to ensure the implementation of an appropriate operation verification.

A configuration is also possible in which the first condition includes a condition that the same types as all of the types indicated by the system configuration information are indicated by the verified configuration information. With this arrangement, when updating firmware, it is possible to ensure the implementation of an operation verification of updated firmware using an electronic control unit of the same type as each electronic control unit connected to an on-board network in a vehicle provided with a gateway device.

A configuration is also possible in which the operations additionally include transmitting the system configuration information to the external device, and the controlling operation includes, if the received firmware update information has been transmitted after the external device references the system configuration information and conducts an operation verification of the updated firmware using a plurality of electronic control units, performing an update based on the updated firmware of the firmware update information. With this arrangement, firmware is updated after first causing an external device to conduct an operation verification of updated firmware using an electronic control unit of the same type as each electronic control unit connected to an on-board network in a vehicle provided with a gateway device, thereby reducing the possibility of the vehicle ceasing to function correctly after updating the firmware.

A configuration is also possible in which the system configuration information includes, for each of the plurality of electronic control units connected to the bus, identification information regarding each electronic control unit and identification information regarding a version of firmware implemented in each electronic control unit for specifying the type. With this arrangement, in an external device, it becomes possible to conduct an operation verification in an operating environment implementing firmware of the same version as the firmware in each electronic control unit connected to an on-board network, and as a result, reduce the possibility of the vehicle ceasing to function correctly after updating the firmware.

A configuration is also possible in which the operations additionally include transmitting the system configuration information to the external device, the firmware update information includes verified configuration information indicating the type of each of the plurality of electronic control units used in the operation verification of the updated firmware, and the controlling operation includes, in a case of confirming that the same types as all of the types indicated by the system configuration information are not indicated by the verified configuration information, deterring an update based on the updated firmware, and transmitting the system configuration information to the external device. With this arrangement, in a case in which an operation verification of updated firmware appropriate to the configuration of an on-board network in a vehicle provided with a gateway device is not conducted, information useful for causing an appropriate operation verification to be conducted is transmitted, thereby raising the possibility of ensuring the implementation of an appropriate operation verification of the updated firmware.

A configuration is also possible in which the firmware update information includes verified configuration information indicating the type of each of the plurality of electronic control units used in the operation verification of the updated firmware, and the controlling operation includes, in a case of confirming that the same types as all of the types indicated by the system configuration information are not indicated by the verified configuration information, executing a simulation of operation of the updated firmware using respective electronic control units of the same types as all of the types indicated by the system configuration information, and after operation verification is performed by the execution of the simulation, performing an update based on the updated firmware. With this arrangement, in a case in which an operation verification is not conducted with respect to each electronic control unit on an on-board network, firmware is updated after conducting an operation verification of updated firmware by simulation, thereby reducing the possibility of the vehicle ceasing to function correctly after updating the firmware. Note that, for example, for firmware transmitted after conducting an operation verification with respect to a standard electronic control unit configuration, since the operation verification is no longer appropriate in a state after an electronic control unit provided in a vehicle is replaced or added, newly conducting an appropriate operation verification is useful.

A configuration is also possible in which the controlling operation includes executing a simulation of operation of the updated firmware using respective electronic control units of the same types as all of the types indicated by the system configuration information, and after operation verification is performed by the execution of the simulation, performing an update based on the updated firmware. With this arrangement, firmware is updated after conducting an operation verification of updated firmware by simulation, thereby reducing the possibility of the vehicle ceasing to function correctly after updating the firmware.

A configuration is also possible in which the plurality of electronic control units connected to the bus communicate over the bus in accordance with a controller area network (CAN) protocol, and the controlling operation includes transmitting the updated firmware to the relevant electronic control unit over the bus. With this arrangement, after the implementation of an operation verification of updated firmware is ensured, updated firmware is transmitted to an electronic control unit on an on-board network conforming to CAN and the firmware is updated, thereby reducing the possibility of the vehicle ceasing to function correctly after updating the firmware.

Also, a method according to one aspect of the present disclosure is a method comprising: receiving, by a gateway device connected to a bus used for communication by a plurality of electronic control units provided on-board a vehicle, from an external device external to the vehicle, firmware update information that includes updated firmware for one electronic control unit from among the plurality of electronic control units; acquiring, by the gateway device, system configuration information indicating a type of each of the plurality of electronic control units connected to the bus; and performing, by the gateway device, a controlling operation to update firmware of the relevant electronic control unit on a basis of the updated firmware, after an operation verification of the updated firmware is performed using an electronic control unit of each type indicated by the system configuration information. With this arrangement, when updating firmware an update control is conducted with respect to multiple electronic control units after ensuring the implementation of an operation verification of the updated firmware, thereby reducing the possibility of the vehicle ceasing to function correctly after updating the firmware compared to a case in which an operation verification is not conducted.

A configuration is also possible in which the method further comprises: executing, by the external device, an operation verification of the updated firmware using a plurality of electronic control units; and transmitting, by the external device, verified configuration information indicating a type of each of the plurality of electronic control units used in the execution of the operation verification, the verified configuration information being included in the firmware update information, wherein the controlling operation includes comparing the type of each of the plurality of electronic control units provided on-board the vehicle as indicated by the system configuration information to the type of each of the plurality of electronic control units used in the operation verification as indicated by the verified configuration information, and performing an update based on the updated firmware if a result of the comparison satisfies a first condition. With this arrangement, it is possible to confirm whether or not a valid operation verification has been executed with respect to the configuration of an on-board network (the organization of an electronic control unit group) in a vehicle provided with a gateway device, thereby making it possible to ensure the implementation of an appropriate operation verification.

A configuration is also possible in which the method further comprises: transmitting, by the gateway device, to the external device, the system configuration information; receiving, by the external device, the system configuration information; executing, by the external device, an operation verification of the updated firmware using a plurality of electronic control units of the same types as all of the types indicated by the received system configuration information; and transmitting, by the external device, the firmware update information after the execution of the operation verification, wherein the controlling operation additionally includes performing an update based on the updated firmware in a case of receiving the firmware update information after the transmission of the system configuration information. With this arrangement, firmware is updated after an operation verification of updated firmware using an electronic control unit of the same type as each electronic control unit connected to an on-board network in a vehicle provided with a gateway device is conducted by an external device, thereby reducing the possibility of the vehicle ceasing to function correctly after updating the firmware.

Also, a recording medium according to one aspect of the present disclosure is a computer-readable, non-transitory recording medium storing a program that, when executed by a processor provided in a gateway device connected to a bus used for communication by a plurality of electronic control units provided on-board a vehicle, causes the processor to execute a method comprising: receiving, from an external device external to the vehicle, firmware update information that includes updated firmware for one electronic control unit from among the plurality of electronic control units; acquiring system configuration information indicating a type of each of the plurality of electronic control units connected to the bus; and performing a controlling operation to update firmware of the relevant electronic control unit on a basis of the updated firmware, after an operation verification of the updated firmware is performed using an electronic control unit of each type indicated by the system configuration information. By having the control program be installed and executed on a device inside the vehicle that includes a processor (for example, a gateway device), when updating firmware, the update is controlled after ensuring the implementation of an operation verification of updated firmware with respect to multiple electronic control units. For this reason, the possibility of the vehicle ceasing to function correctly after updating the firmware is reduced.

Note that these general or specific aspects may also be realized by a system, method, integrated circuit, computer program, or computer-readable recording medium such as a CD-ROM disc, and may also be realized by an arbitrary combination of a system, method, integrated circuit, computer program, and recording medium.

Hereinafter, an on-board network system including a gateway device according to an embodiment will be described with reference to the drawings. Each of the embodiments indicated herein illustrates a specific example of the present disclosure. Consequently, features such as numerical values, component elements, layout positions and connection states of component elements, as well as steps and the ordering of steps indicated in the following embodiments are merely examples, and are not intended to limit the present disclosure. Among the component elements in the following embodiments, component elements that are not described in the independent claims are arbitrary or optional component elements. Also, each diagram is a schematic diagram, and does not necessarily illustrate a strict representation.

(Embodiment 1)

Hereinafter, as an embodiment of the present disclosure, a firmware update method used in an on-board network system 10 in which multiple electronic control units (ECUs), including a gateway device, communicate over buses will be described using the drawings.

The firmware update method is a method for updating the firmware (FW) installed in each ECU on board a vehicle to new, updated firmware (in other words, replacing the firmware with updated firmware) delivered from a server located externally to the vehicle. In the on-board network system 10, to reduce the possibility of the vehicle ceasing to function correctly after updating firmware, a method is used in which the firmware is updated after conducting an operation verification of the updated firmware using multiple ECUs corresponding to the vehicle.

[1.1 Overall Configuration of On-Board Network System 10]

FIG. 1 is a diagram illustrating an overall configuration of the on-board network system 10 according to Embodiment 1.

The on-board network system 10 is an example of a network communication system that communicates in accordance with the CAN protocol, and is a network communication system in a vehicle having various types of equipment, such as control devices, sensors, actuators, and user interface devices installed on-board. The on-board network system 10 is equipped with multiple devices that communicate by frames via buses, and uses a firmware update method.

Specifically, as illustrated in FIG. 1, the on-board network system 10 is configured to include ECUs 100a to 100d connected to various equipment on-board the vehicle, buses 200a and 200b, a gateway 300, as well as a network 400 and a server 500 outside the vehicle. Note that although the on-board network system 10 may include any number of ECUs other than the gateway 300 and the ECUs 100a to 100d, the description herein will focus on the gateway 300 and the ECUs 100a to 100d for the sake of convenience. An ECU is a device that includes components such as a processor (microprocessor), digital circuits such as memory, analog circuits, and communication circuits. The memory is memory such as ROM and RAM, and is able to store a control program (a computer program as software) executed by the processor. The firmware is all or part of the control program, and is stored in non-volatile memory (designated the boot ROM) such as electrically erasable read-only memory (EEPROM), for example. For example, by having the processor operate by following the control program (computer program), the ECU realizes various functions. Note that the computer program herein is made up of a plural combination of instruction codes indicating commands to the processor in order to achieve a designated function. Note that the firmware may also include all or some of the microcode for command interpretation in the processor.

The ECUs 100a to 100d are connected to equipment such as an engine 101, a brake 102, a door open/close sensor 103, and a window open/close sensor 104, respectively, acquiring the respective states of the equipment and periodically transmitting frames indicating the states (data frames) to an on-board network made up of devices such as the buses 200a and 200b.

The gateway 300 is a type of ECU that acts as a gateway device connecting the bus 200a, to which the ECU 100a and the ECU 100b are connected, and the bus 200b, to which the ECU 100c and the ECU 100d are connected. The gateway 300 includes a function of forwarding a frame received from one bus to the other bus, and also includes a function of communicating with the server 500 via the network 400.

The server 500 that acts as an external device located externally to the vehicle is a computer that includes a function of delivering via the network 400 FW update information, which is data for updating the firmware of the ECUs 100a to 100d. For communication on the network 400, any wired or wireless communication protocol may be applied.

The respective ECUs in the on-board network system 10 exchange frames in accordance with the CAN protocol. Frames in the CAN protocol include data frames, remote frames, overload frames, and error frames.

[1.2 Data Frame Format]

Hereinafter, a data frame, which is one of the frames used on a network following the CAN protocol, will be described.

Figure 2:
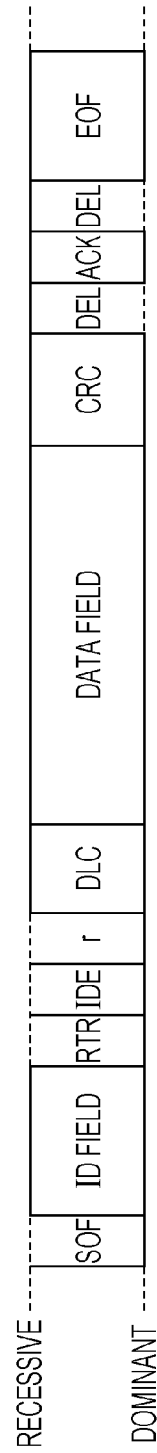
FIG. 2 is a diagram illustrating the data frame format prescribed by the CAN protocol.

FIG. 2 is a diagram illustrating the data frame format prescribed by the CAN protocol. FIG. 2 illustrates a data frame in the standard ID format prescribed by the CAN protocol. A data frame is made up of the following fields: Start of Frame (SOF), ID field, Remote Transmission Request (RTR), Identifier Extension (IDE), reserved bit "r", Data Length Code (DLC), data field, cyclic redundancy check (CRC) sequence, CRC delimiter "DEL", Acknowledgement (ACK) slot, ACK delimiter "DEL", and End of Frame (EOF).

The SOF is made up of one bit in the dominant state. The idle state of a bus is recessive, and changing to dominant with the SOF is a notification of the start of the transmission of a frame.

The ID field is an 11-bit field storing an ID (message ID), which is a value indicating the type of data. When multiple nodes start transmission at the same time, to conduct communication mediation with the ID field, the frame having the ID with the smaller value is designed to take higher priority.

The RTR is a value for distinguishing between a data frame and a remote frame, and is made up of one dominant bit in a data frame.

The IDE and "r" are both made up of one dominant bit.

The DLC is made up of 4 bits, and is a value indicating the length of the data field. Note that the IDE, "r", and the DLC are collectively designated the control field.

The data field is made up of a maximum of 64 bits, and is a value indicating the content of the data to be transmitted. The length is adjustable in units of 8 bits. The format of the data to be sent is not prescribed by the CAN protocol, and is decided by the on-board network system 10. Consequently, the data format depends on factors such as the model of the car and the manufacturer.

The CRC sequence is made up of 15 bits, and is computed according to the transmitted values of the SOF, the ID field, the control field, and the data field.

The CRC delimiter is made up of one recessive bit, and is a delimiter indicating the end of the CRC sequence. Note that the CRC sequence and the CRC delimiter are collectively designated the CRC field.

The ACK slot is made up of one bit. The transmitting node sets the ACK slot to recessive for transmission. If the receiving node is able to receive up through the CRC sequence correctly, the receiving node transmits the ACK slot as dominant. Since dominant is prioritized over recessive, if the ACK slot is dominant after transmission, the transmitting node is able to confirm that one of the receiving nodes received data successfully.

The ACK delimiter is made up of one recessive bit, and is a delimiter indicating the end of the ACK.

The EOF is made up of seven recessive bits, and indicates the end of the data frame.

[1.3 Configuration of Gateway 300]

Figure 3:
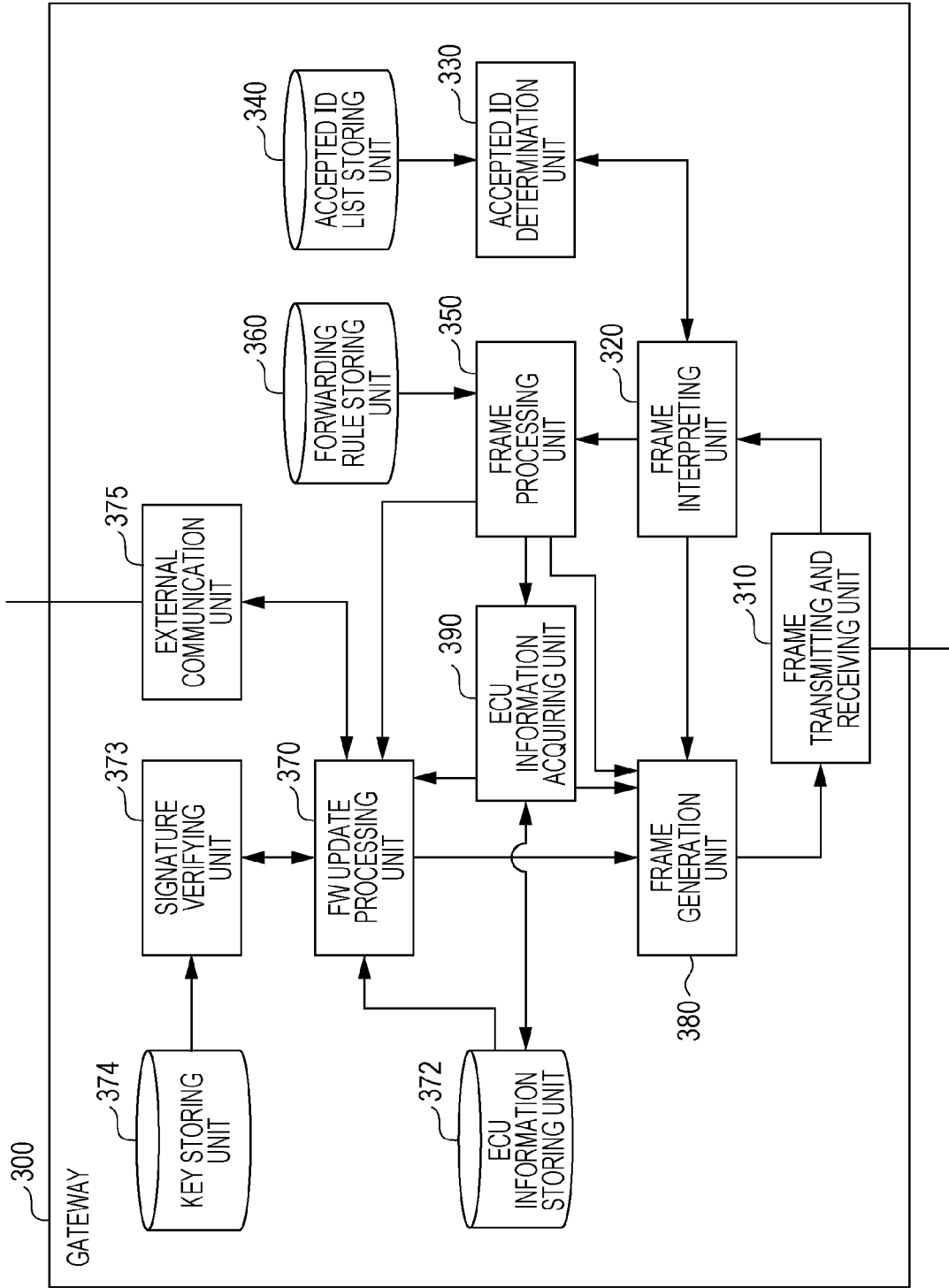
FIG. 3 is a configuration diagram of a gateway according to Embodiment 1.

FIG. 3 is a configuration diagram of the gateway 300. The gateway 300 executes functions such as forwarding frames between buses, and communicating with the external server 500 (such as receiving FW update information for updating the firmware of the ECUs 100a to 100d or the like). For this reason, as illustrated in FIG. 3, the gateway 300 is configured to include a frame transmitting and receiving unit 310, a frame interpreting unit 320, an accepted ID determining unit 330, an accepted ID list storing unit 340, a frame processing unit 350, a forwarding rule storing unit 360, a FW update processing unit 370, an ECU information storing unit 372, a signature verifying unit 373, a key storing unit 374, an external communication unit 375, a frame generating unit 380, and an ECU information acquiring unit 390. These respective component elements are realized by components in the gateway 300, such as a communication circuit, a processor that executes a control program stored in memory, or a digital circuit.

The frame transmitting and receiving unit 310 transmits and receives frames in accordance with the CAN protocol to and from each of the bus 200a and the bus 200b. The bus 200a or the bus 200b receives a frame, and forwards the received frame to the frame interpreting unit 320. Additionally, based on bus information indicating the bus of the destination and a frame reported by the frame generating unit 380, the frame transmitting and receiving unit 310 transmits the content of the frame to the bus 200a or the bus 200b.

The frame interpreting unit 320 receives the values of a frame from the frame transmitting and receiving unit 310, and conducts interpretation to map the values to each field in the frame format prescribed by the CAN protocol. The frame interpreting unit 320 forwards the value determined to be the ID field to the accepted ID determining unit 330. Depending on a determination result reported by the accepted ID determining unit 330, the frame interpreting unit 320 decides whether to forward the value of the ID field and the data field (data) appearing after the ID field to the frame processing unit 350, or stop the reception of the frame. In addition, in the case of determining that the frame does not adhere to the CAN protocol, the frame interpreting unit 320 notifies the frame generating unit 380 to transmit an error frame. Also, if an error frame is received, the frame interpreting unit 320 discards the rest of the frame, or in other words, stops interpretation of the frame.

The accepted ID determining unit 330 receives the value of the ID field reported by the frame interpreting unit 320, and follows a message ID list stored by the accepted ID list storing unit 340 to determine whether or not to receive each field in the frame following the ID field. The accepted ID determining unit 330 reports the determination result to the frame interpreting unit 320.

The accepted ID list storing unit 340 stores an accepted ID list, which is a list of IDs (message IDs) that the gateway 300 is to receive. FIG. 4 is a diagram illustrating an example of an accepted ID list.

The frame processing unit 350 follows forwarding rules stored in the forwarding rule storing unit 360 to decide the bus to forward to according to the ID of the received frame, and reports to the frame generating unit 380 the bus information about the bus to forward to, as well as the message ID and data reported by the frame interpreting unit 320. Additionally, the frame processing unit 350 reports to the FW update processing unit 370 data about an update result related to a firmware update reported by the frame interpreting unit 320, and reports to the ECU information acquiring unit 390 data related to ECU information. Note that the frame processing unit 350 does not treat data about an update result related to a firmware update and data related to ECU information as data to forward.

The forwarding rule storing unit 360 stores forwarding rules, which are information expressing rules for forwarding frames for each bus. FIG. 5 is a diagram illustrating an example of forwarding rules.

The FW update processing unit 370 requests the signature verifying unit 373 for a signature verification of FW update information including FW data such as updated firmware reported by the external communication unit 375, and in the case of a successful signature verification, reports to the frame generating unit 380 FW data related to updated firmware and bus information about the bus connected to an ECU to be updated. Additionally, the FW update processing unit 370 reports to the external communication unit 375 an update result reported by the frame processing unit 350. Additionally, the FW update processing unit 370, on the basis of a notification or the like from the ECU information acquiring unit 390, reports system configuration information, which is a set of ECU information stored in the ECU information storing unit 372, to the external communication unit 375 as a FW update request. Also, the FW update processing unit 370 reports to the frame generating unit 380 data necessary to communicate with the ECUs 100a to 100d. Note that the FW update processing unit 370 functions as an update processing unit that receives FW update information including FW data such as updated firmware after an operation verification of the updated firmware is performed using various types of ECUs indicated by the system configuration information, and in the case of a successful signature verification, finally controls the updating of the firmware for the relevant ECUs (such as transmitting FW data to an ECU via a bus, for example).

The ECU information storing unit 372 stores system configuration information, namely, a set of ECU information which is information respectively related to all of the ECUs (ECUs 100a to 100d) joined to the bus 200a and the bus 200b. An example of the system configuration information is illustrated in FIG. 6.

The signature verifying unit 373 receives data on which to perform signature verification related to FW update information from the FW update processing unit 370, performs signature verification using a key for signature verification acquired from the key storing unit 374, and reports the verification result to the FW update processing unit 370.

The key storing unit 374 stores keys for signature verification of FW update information received from the server 500.

The external communication unit 375 functions as a reception unit that receives FW update information including FW data related to updated firmware from the server 500, and reports the received FW update information to the FW update processing unit 370. Additionally, the external communication unit 375 transmits an update result reported by the FW update processing unit 370 to the server 500. Additionally, the external communication unit 375 functions as a transmission unit that transmits system configuration information reported from the FW update processing unit 370 to an external device, namely the server 500, as a FW update request. The external communication unit 375 stores in advance address information of the server 500 needed to access the server 500 via the network 400, for example.

The frame generating unit 380 reports and transmits to the frame transmitting and receiving unit 310 an error frame in accordance with a request to transmit an error frame reported from the frame interpreting unit 320. In addition, the frame generating unit 380 constructs a frame using the message ID and data reported by the frame processing unit 350, and passes the frame together with bus information to the frame transmitting and receiving unit 310. In addition, the frame generating unit 380 constructs a frame using FW data related to updated firmware reported by the FW update processing unit 370, and passes the frame together with bus information to the frame transmitting and receiving unit 310. In addition, the frame generating unit 380 constructs a frame for ECU information acquisition in accordance with a request reported from the ECU information acquiring unit 390, and passes the constructed frame to the frame transmitting and receiving unit 310 for transmission.

To acquire ECU information from all ECUs joined to the bus 200a and the bus 200b, the ECU information acquiring unit 390 periodically requests the frame generating unit 380 to generate and transmit a frame (data frame) for ECU information acquisition, for example. Note that upon receiving a frame for ECU information acquisition, each ECU transmits ECU information in a frame (data frame) with a predetermined ID so as to arrive at the gateway 300. For this reason, the ECU information acquiring unit 390 is notified of and acquires data related to the ECU information of each ECU from the frame processing unit 350, and on the basis of this ECU information, updates the ECU information of the system configuration information stored by the ECU information storing unit 372 as necessary. In other words, the ECU information acquiring unit 390 functions as an acquisition unit that acquires system configuration information indicating the type of each of the multiple ECUs connected to the buses 200a and 200b.

[1.4 Accepted ID List Example]

FIG. 4 is a diagram illustrating an example of an accepted ID list stored in the accepted ID list storing unit 340 of the gateway 300.

The accepted ID list illustrated as an example in FIG. 4 is used to selectively receive and process frames including a message ID whose ID (message ID) value is any of "1", "2", "3", and "4". This is merely one example, but in the accepted ID list, the message IDs of frames that the gateway 300 is predetermined to receive are listed.

[1.5 Forwarding Rules Example]

FIG. 5 illustrates an example of forwarding rules stored by the forwarding rule storing unit 360 of the gateway 300.

These forwarding rules associate a forwarding source bus, a forwarding destination bus, and a forwarding target ID (message ID). In FIG. 5, "*" indicates that frames are forwarded regardless of the message ID. The example in FIG. 5 indicates that frames received from the bus 200a are configured to be forwarded to the bus 200b, regardless of the message ID. The example in FIG. 5 also indicates that, among the frames received from the bus 200b, only the frames having a message ID of "3" are configured to be forwarded to the bus 200a.

[1.6 System Configuration Information Example]

FIG. 6 illustrates an example of system configuration information (a set of ECU information) stored by the ECU information storing unit 372 of the gateway 300.

The system configuration information in this example is a list of ECU information for each ECU. The ECU information is configured to include an ECU-ID, an ECU class that indicates the functional class of the ECU, the manufacturing company of the ECU, and a FW version, such as a version number, of the firmware implemented in the ECU. The ECU-ID is an identifier (identification information) such as a serial number unique to each ECU, for example. The ECU type is identifiable from the ECU-ID and the FW version. Multiple ECUs of the same type are multiple ECUs having the same function related to the operation of exchanging data via a bus, for example, whereas multiple ECUs of different types are multiple ECUs having mutually different functions related to such operation. The example in FIG. 6 indicates that, for the ECU 100a connected to the engine 101, the ECU-ID is "0001", the ECU class is a class used for engine control identified by "engine", the manufacturing company is "A Corp.", the FW version of the ECU-ID is 1.0, and the like. The initial values of the system configuration information may be set during manufacturing, or may be acquired by the gateway 300 from an external device such as the server 500 when a supply of power to the gateway 300 is started, for example. If an ECU connected to the bus 200a or 200b is replaced or changes state due to a firmware update or the like, or if an ECU is newly introduced into the vehicle and connected to the bus 200a or the bus 200b, system configuration information may be updated successively to indicate the most recent state of each ECU inside the vehicle, on the basis of the ECU information periodically gathered by the ECU information acquiring unit 390.

[1.7 Configuration of ECU 100a]

Figure 7:
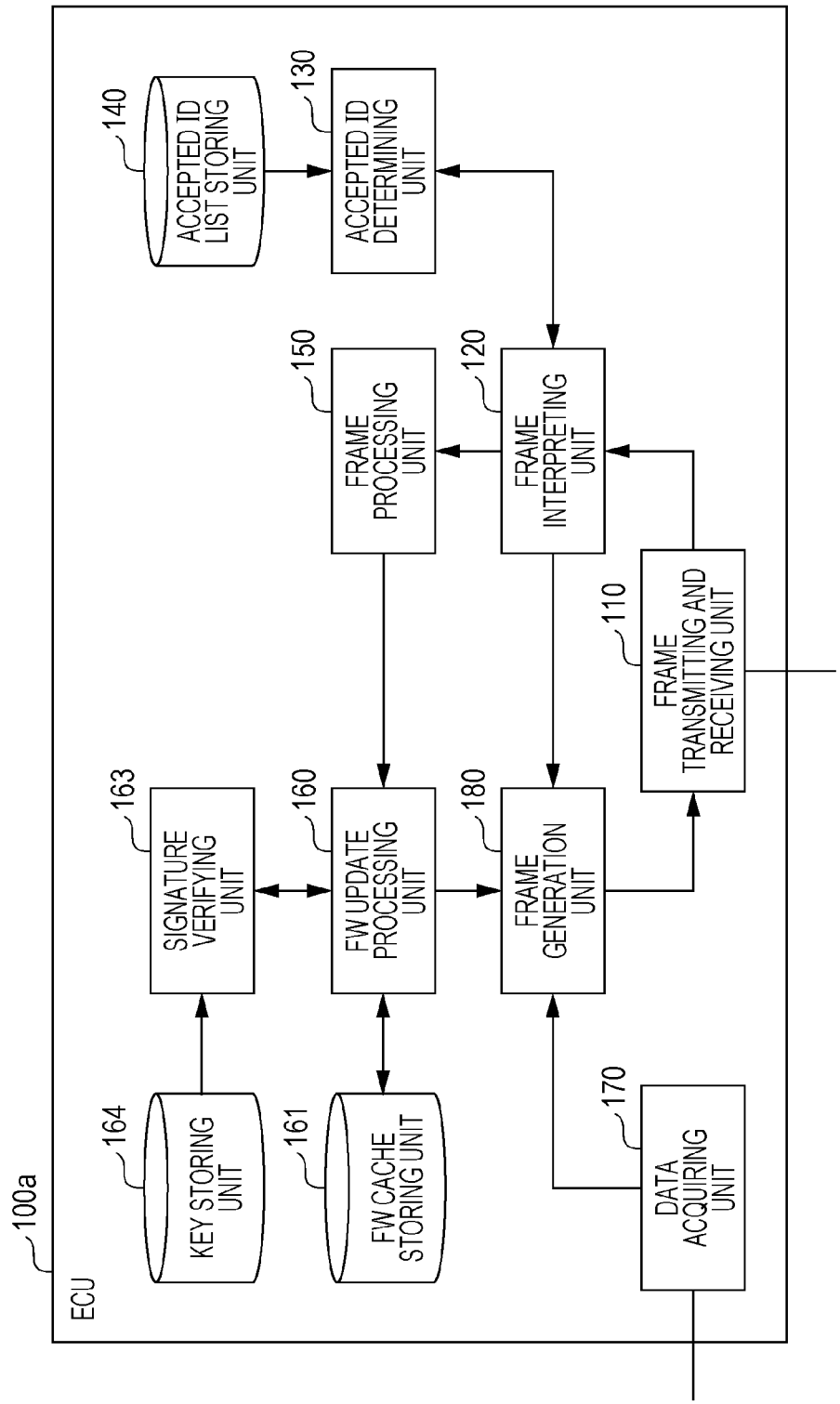
FIG. 7 is a configuration diagram of an ECU according to Embodiment 1.

FIG. 7 is a configuration diagram of the ECU 100a. The ECU 100a is configured to include a frame transmitting and receiving unit 110, a frame interpreting unit 120, an accepted ID determining unit 130, an accepted ID list storing unit 140, a frame processing unit 150, a FW update processing unit 160, a FW cache storing unit 161, a signature verifying unit 163, a key storing unit 164, a data acquiring unit 170, and a frame generating unit 180. These respective component elements are realized by components in the ECU 100a, such as a communication circuit, a processor that executes a control program stored in memory, or a digital circuit.

The frame transmitting and receiving unit 110 transmits and receives frames in accordance with the CAN protocol to and from the bus 200a. The frame transmitting and receiving unit 310 receives a frame one bit at a time from a bus, and forwards the received frame to the frame interpreting unit 120. Additionally, the frame transmitting and receiving unit 110 transmits the content of a frame received in a notification from the frame generating unit 180 to the bus 200a.

The frame interpreting unit 120 receives the values of a frame from the frame transmitting and receiving unit 110, and conducts interpretation to map the values to each field in the frame format prescribed by the CAN protocol. The value determined to be the ID field is forwarded to the accepted ID determining unit 130. Depending on a determination result reported by the accepted ID determining unit 130, the frame interpreting unit 120 decides whether to forward the value of the ID field and the data field appearing after the ID field to the frame processing unit 150, or stop the reception of the frame after receiving the determination result. In addition, in the case of determining that the frame does not adhere to the CAN protocol, the frame interpreting unit 120 notifies the frame generating unit 180 to transmit an error frame. Also, if an error frame is received, the frame interpreting unit 120 discards the rest of the frame, or in other words, stops interpretation of the frame.

The accepted ID determining unit 130 receives the value of the ID field indicated in a notification from the frame interpreting unit 120, and follows a message ID list stored by the accepted ID list storing unit 140 to determine whether or not to receive each field in the frame following the ID field. The accepted ID determining unit 130 reports the determination result to the frame interpreting unit 120.

The accepted ID list storing unit 140 stores an accepted ID list, which is a list of message IDs that the ECU 100a is to receive. This accepted ID list is similar to the example in FIG. 4 described earlier, for example.

The frame processing unit 150 conducts a different process for each ECU according to the data of the received frame. For example, the ECU 100a connected to the engine 101 is equipped with a function of emitting an alarm sound if the door is open while in a state in which the speed exceeds 30 km. Additionally, the frame processing unit 150 of the ECU 100a manages data received from other ECUs (for example, information indicating the state of a door), and conducts a process such as emitting an alarm sound under a certain condition based on the speed acquired from the engine 101. The ECU 100c is equipped with a function of emitting an alarm sound if a door is opened in a situation in which the brake is not applied. In the ECUs 100b and 100d, the frame processing unit 150 does not do anything in particular. Note that the ECUs 100a to 100d may also be equipped with functions other than the above. Additionally, when FW data for updating firmware is acquired, and when data related to a frame for ECU information acquisition is acquired, the frame processing unit 150 reports the data to the FW update processing unit 160.

The FW update processing unit 160 requests the signature verifying unit 163 for a signature verification of FW data received from the gateway 300 and reported from the frame processing unit 150, and if the signature verification is successful, updates (rewrites) the firmware inside the boot ROM of the ECU 100a based on the FW data. The boot ROM is non-volatile memory set as a storage destination for firmware to be executed after a reset by the processor of the ECU 100a, for example. When updating the firmware inside the boot ROM, the FW update processing unit 160 stores the existing firmware in the FW cache storing unit 161, for example, to enable recovery to the pre-update state if the update fails. Additionally, the FW update processing unit 160 notifies the frame generating unit 180 to generate and transmit a frame indicating the update result of the firmware based on the FW data. The firmware update result may also include a FW version, such as a version number, of the updated firmware, for example. In addition, in the case of receiving a notification related to a frame for ECU information acquisition from the frame processing unit 150, the FW update processing unit 160 notifies the frame generating unit 180 to generate and transmit a frame about ECU configuration information including the ECU-ID and the FW version of the current firmware for the ECU 100a.

The FW cache storing unit 161 is realized by a storage area such as non-volatile memory in the ECU 100a, for example, and is used for actions such as storing the existing firmware when updating the firmware inside the boot ROM.

The signature verifying unit 163 receives FW data on which to perform signature verification from the FW update processing unit 160, performs signature verification using a key for signature verification acquired from the key storing unit 164, and reports the verification result to the FW update processing unit 160.

The key storing unit 164 stores keys for signature verification of FW data used to update the firmware.

The data acquiring unit 170 acquires data indicating the states of components such as equipment and sensors connected to the ECU, and reports to the frame generating unit 180.

The frame generating unit 180 constructs an error frame in accordance with a notification of instructions to transmit an error frame from the frame interpreting unit 120, and passes the error frame to the frame transmitting and receiving unit 110 for transmission. Additionally, the frame generating unit 180 constructs a frame by attaching a predetermined message ID to the value of the data reported by the data acquiring unit 170, and passes the constructed frame to the frame transmitting and receiving unit 110. Additionally, the frame generating unit 180 constructs frames with respectively predetermined message IDs attached according to instructions from the FW update processing unit 160 to generate a frame about the firmware update result or a frame about ECU configuration information, and passes the constructed frames to the frame transmitting and receiving unit 110.

The ECUs 100b to 100d are also provided with a configuration mostly similar to the ECU 100a.

[1.8 Configuration of Server 500]

The server 500 is a computer located externally to the vehicle in which the on-board network system 10 is installed on-board, and includes components such as a storage medium like memory or a hard disk, a processor, and a communication circuit. The server 500 may also be equipped with components such as an input device (such as a keyboard) and a display as a user interface. Presupposing that multiple ECUs related to an on-board network are installed on-board each of multiple vehicles, the server 500 includes a function of managing the firmware provided by the manufacturing companies or the like of various ECUs, conducting a firmware operation verification, and delivering FW update information including updated firmware to each vehicle.

Figure 8:
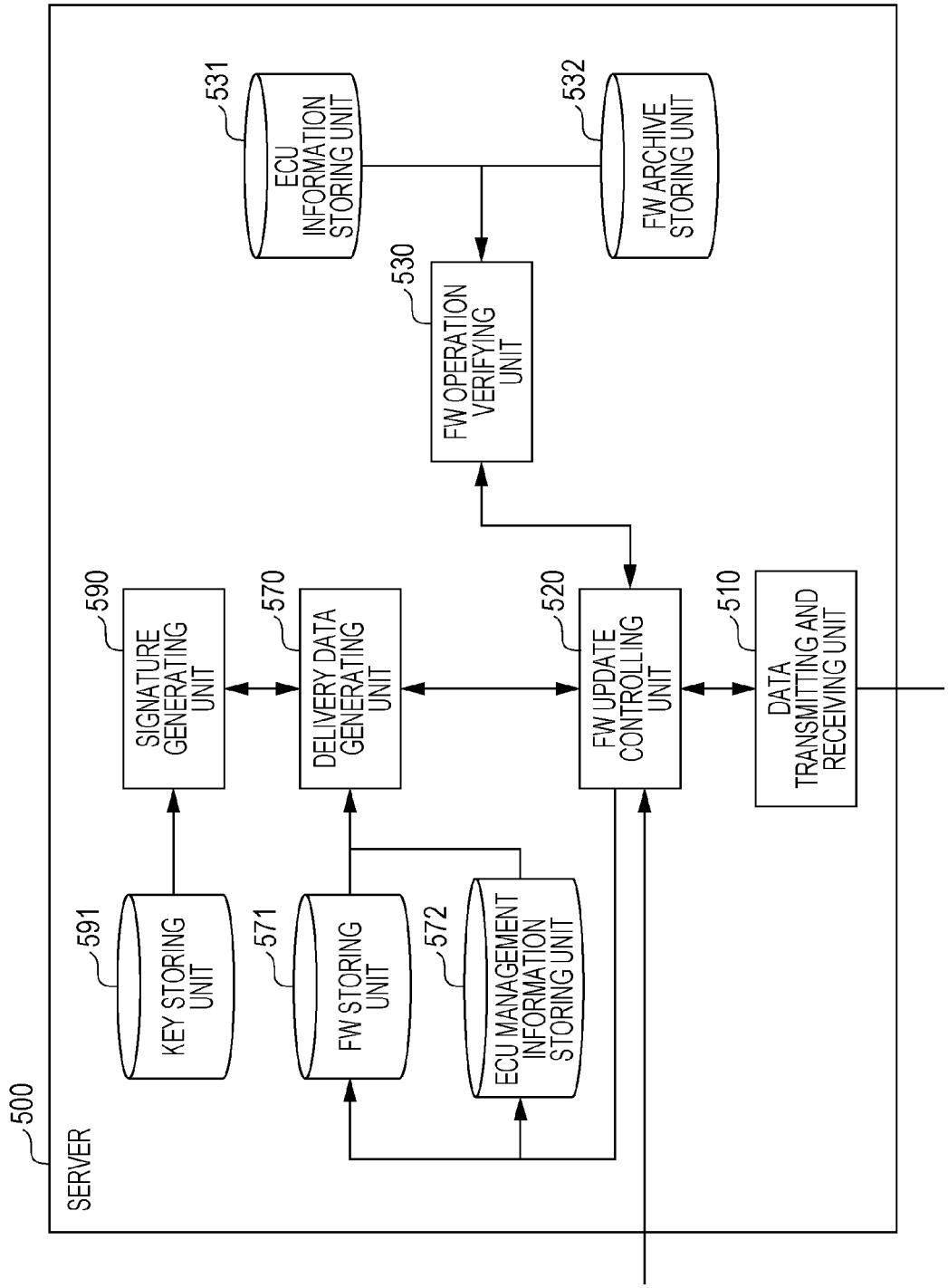
FIG. 8 is a configuration diagram of a server according to Embodiment 1.

FIG. 8 is a configuration diagram of the server 500. As illustrated in the diagram, the server 500 is configured to include a data transmitting and receiving unit 510, a FW update controlling unit 520, a FW operation verifying unit 530, an ECU information storing unit 531, a FW archive storing unit 532, a delivery data generating unit 570, a FW storing unit 571, an ECU management information storing unit 572, a signature generating unit 590, and a key storing unit 591. These respective component elements are realized by components in the server 500, such as a communication circuit, or a processor that executes a control program stored in memory.

The data transmitting and receiving unit 510 communicates with the gateway 300 to transmit and receive data. In the case of receiving system configuration information as a request to update firmware (FW update request) from the gateway 300, the data transmitting and receiving unit 510 notifies the FW update controlling unit 520, and if firmware to be updated exists with respect to the FW update request, the data transmitting and receiving unit 510 receives FW update information from the FW update controlling unit 520, and transmits the FW update information to the gateway 300. In the case of receiving a firmware update result from the gateway 300, the data transmitting and receiving unit 510 notifies the FW update controlling unit 520.

In the case in which the latest firmware for an ECU is uploaded to the server 500 from a terminal device at the manufacturing company of the ECU or the like, the FW update controlling unit 520 stores the firmware in the FW storing unit 571, and on the basis of information from the terminal device, manages the firmware in association with a FW version indicating the version number or the like, and information indicating the type of the target ECU or the like. In the case of receiving system configuration information related to a FW update request from the gateway 300 via the data transmitting and receiving unit 510, and in the case in which firmware to be updated exists with respect to the gateway 300 on the basis of the system configuration information, the FW update controlling unit 520 causes the delivery data generating unit 570 to generate FW update information as a package of updated firmware. Note that the 520 may determine whether or not firmware to be updated exists on the basis of firmware-related information stored by the FW storing unit 571 and the system configuration information, for example. On the basis of the system configuration information, the FW update controlling unit 520 requests the FW operation verifying unit 530 for an operation verification of the firmware to be updated, and after operation is verified (that is, after the firmware is verified to be operating appropriately without problems), the FW update controlling unit 520 causes the data transmitting and receiving unit 510 to transmit the FW update information. Note that in the case in which verification fails during the operation verification for the updated firmware (that is, in the case in which the updated firmware does not operate appropriately), the server 500 does not transmit FW update information including the updated firmware to the gateway 300. In addition, in the case of receiving a firmware update result from the gateway 300, the FW update controlling unit 520 updates vehicle ECU management information stored by the ECU management information storing unit 572.

The FW operation verifying unit 530 includes a function of executing a FW operation verification process for verifying that the updated firmware and the firmware of each ECU in an operating environment are operating appropriately (correctly), the operating environment being configured with ECUs of the same type as each of the ECUs indicated by the system configuration information received in the request from the FW update controlling unit 520. In the FW operation verification process, operations such as an update operation of applying updated firmware to an ECU to be updated in the operating environment, and an operation of determining whether or not each ECU in the operating environment is operating correctly after the update, are verified, for example. In the FW operation verification process, operation verification of the updated firmware may be conducted by using the hardware of various ECUs as the operating environment, or operation verification of the updated firmware may be conducted by simulation in a virtual environment that simulates various ECUs. Herein, an example will be supposed and described in which operation verification of the updated firmware is conducted by simulation in a virtual environment that simulates various ECUs.

The ECU information storing unit 531 stores information (software) for simulating various ECUs. The information includes the most recent firmware being used by the various ECUs.

The FW archive storing unit 532 stores all firmware, including not only the most recent firmware corresponding to various ECUs, but also previous versions of the firmware. The FW operation verifying unit 530 references the ECU information storing unit 531 and the FW archive storing unit 532 to construct an operating environment that simulates ECUs of the same type of each of the ECUs identified by the ECU-ID and FW version in the system configuration information, and by performing an update by applying the updated firmware and conducting a simulation of the subsequent operation, verifies whether or not operation is conducted appropriately without problems.

The delivery data generating unit 570 generates FW update information as a package of updated firmware to be delivered to the gateway 300, and requests the signature generating unit 590 to generate a signature for the FW update information. The format of the FW update information will be described later (see FIG. 10).

The FW storing unit 571 stores uploaded firmware for ECUs.

The ECU management information storing unit 572 stores vehicle ECU management information, which is information related to each ECU in the on-board network of each vehicle. The vehicle ECU management information will be described later (see FIG. 9).

The signature generating unit 590 receives a request from the delivery data generating unit 570, uses a signature key stored in the key storing unit 591 to generate a signature for the FW update information, and passes the signature to the delivery data generating unit 570. The signature generating unit 590 may generate a signature for each piece of FW data in the FW update information, and a signature for the FW update information as a whole.

The key storing unit 591 stores a key that the signature generating unit 590 uses to sign the FW update information.

[1.9 ECU Management Information Example]

FIG. 9 illustrates an example of vehicle ECU management information (a set of ECU information by vehicle) stored by the ECU management information storing unit 572 of the server 500.

The vehicle ECU management information in this example is configured to include vehicle information about each vehicle managed by the server 500, and ECU information about each ECU installed on-board a vehicle. The vehicle information is an identifier for identifying the vehicle (vehicle ID). In the vehicle ECU management information, the ECU information associated with the vehicle information is configured to include an ECU-ID, an ECU class that indicates the functional class of the ECU, the manufacturing company of the ECU, a FW version which is a version number or the like of the firmware installed in the ECU, and a latest FW version which is a version number or the like of the latest firmware corresponding to that ECU. Each piece of ECU information for a certain vehicle in the vehicle ECU management information is set on the basis of information received from the gateway 300 of that vehicle (system configuration information and the firmware update result), and the FW versions of firmware uploaded to the server 500 from the manufacturing companies of various ECUs, for example. Note that although FIG. 9 illustrates as an example only information related to a single vehicle A, the vehicle ECU management information may also include information about other vehicles.

[1.10 FW Update Information Format Example]

Figure 10:
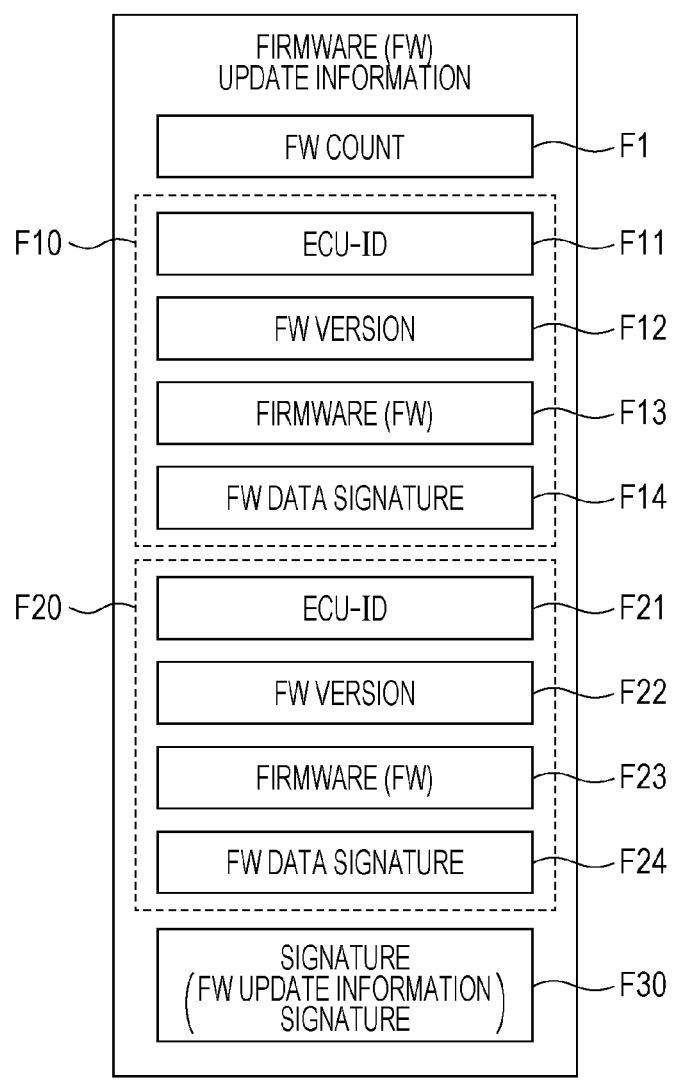
FIG. 10 is a diagram illustrating an example of the format of firmware (FW) update information according to Embodiment 1.

FIG. 10 illustrates an example of the format of FW update information as delivery data that the server 500 delivers.

The FW update information includes a FW count F1 indicating the number of pieces of FW data, one or more pieces of FW data (in the example of FIG. 10, two pieces of individual FW data F10 and F20), and a FW update information signature F30, which is a signature for the FW update information (delivery data) as a whole. The FW data F10 and F20 respectively includes updated firmware (FW) F13 and F23, ECU-IDs F11 and F21 that identify the target ECU, FW versions F12 and F22 that indicate the version number or the like of the firmware, and FW data signatures F14 and F24 which are respective signatures for these data. The firmware F13 and F23 is the firmware itself, or in other words, binary data.

[1.11 Example Operations Related to Updating Firmware by Gateway 300 and the Like]

Herein, operations related to the updating of ECU firmware in the on-board network system 10 will be described.

Figure 11:
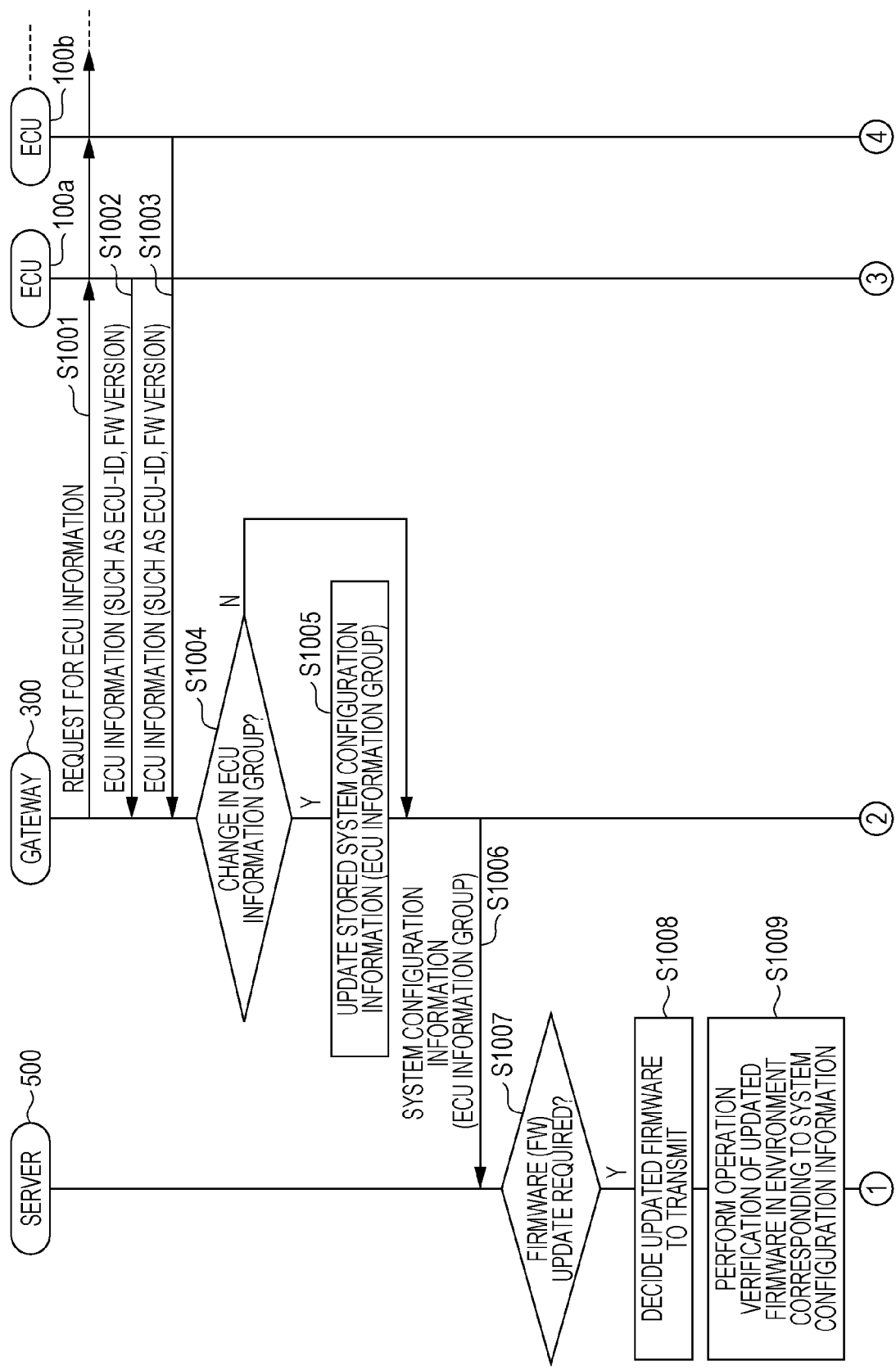
FIG. 11 is a sequence diagram illustrating example operations related to firmware updating according to Embodiment 1 (continuing to FIG. 12)
Figure 12:
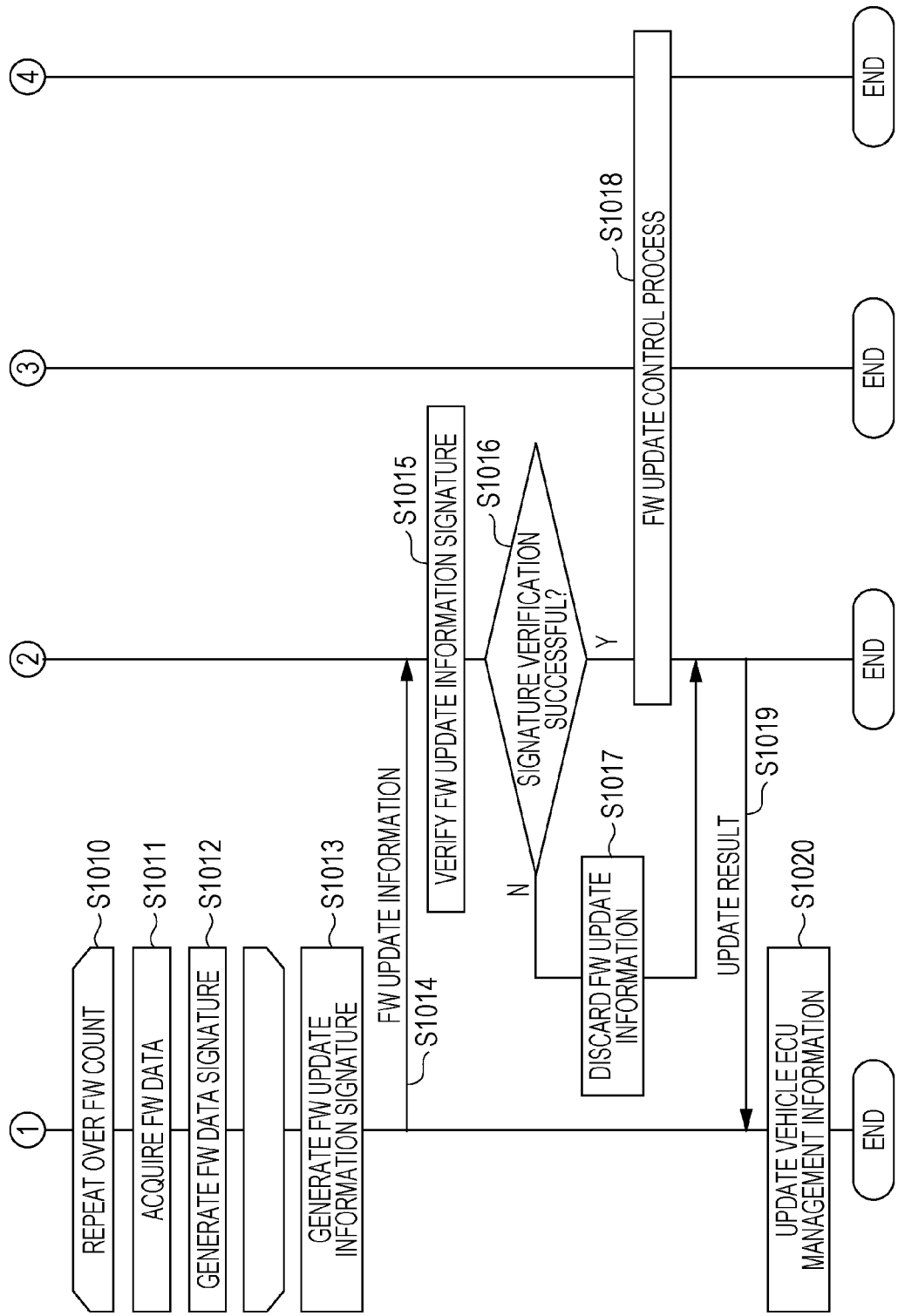
FIG. 12 is a sequence diagram illustrating example operations related to firmware updating according to Embodiment 1 (continuing from FIG. 11)

FIGS. 11 and 12 are sequence diagrams illustrating example operations related to the updating of ECU firmware conducted by the cooperation of devices such as the server 500, the gateway 300, and the ECUs 100a and 100b. Each sequence herein means the respective processing procedures (steps) in each device. Herein, a portion of ECU operations are illustrated for the sake of convenience. The sequences illustrating the example operations are expected to be executed repeatedly on a cycle, such as every time a fixed number of days elapses, for example, but the sequences may also be executed when it is sensed that a new ECU has been added to the on-board network, or may be executed in correspondence with an operation by the driver or the like on any ECU inside the vehicle.

The gateway 300 in the vehicle transmits a frame for ECU information acquisition to the buses 200a and 200b, and thereby requests ECU information from all ECUs (such as the ECUs 100a and 100b) connected to the on-board network (step S1001).

The ECU 100a receiving the frame for ECU information acquisition transmits to the bus 200a a frame including ECU information made up of the ECU-ID and the FW version corresponding to the firmware implemented in the ECU 100a (step S1002). Correspondingly, the gateway 300 receives the frame from the bus 200a, and thereby receives ECU information about the ECU 100a.

Additionally, similarly to the ECU 100a, the ECU 100b receiving the frame for ECU information acquisition also transmits to the bus 200a a frame including ECU information about the ECU 100b (step S1003). Correspondingly, the gateway 300 receives the frame from the bus 200a, and thereby receives ECU information about the ECU 100b. Similarly, the gateway 300 may receive respective ECU information transmitted from each other ECU. Steps S1002 and S1003 are an acquiring step, performed in the gateway 300, that acquires system configuration information (a set of ECU information) indicating the type of each ECU and the like.

Next, in the case in which the set of ECU information acquired from each ECU changes with respect to the ECU information group (set of ECU information) treated as system configuration information stored by the ECU information storing unit 372 (step S1004), the gateway 300 uses with the acquired ECU information to update the system configuration information stored by the ECU information storing unit 372 (step S1005). Note that in the case in which the ECU information acquired from each ECU changes with respect to the stored system configuration information, the gateway 300 may also control a notification of such a change to the driver of the vehicle or the like.

Next, the gateway 300 transmits the system configuration information expressing the organization of all ECUs connected to the on-board network as a set of ECU information stored by the ECU information storing unit 372 to the server 500 as a FW update request (step S1006). Correspondingly, the server 500 receives the system configuration information as a FW update request.

In response to the FW update request, the server 500 determines whether or not it is necessary to update the firmware for one or more ECUs in the vehicle provided with the gateway 300 from which originated the transmission of a FW update request, on the basis of information such as the received system configuration information and the vehicle ECU management information stored by the ECU management information storing unit 572 (step S1007). If updating is unnecessary, the server 500 notifies the gateway 300 that updating is unnecessary, for example. FIG. 11 omits a description of the case in which updating is unnecessary.

In the case of determining that updating firmware is necessary in step S1007, the FW update controlling unit 520 of the server 500 decides one or more pieces of updated firmware to be transmitted, on the basis of information such as the received system configuration information and the vehicle ECU management information stored by the ECU management information storing unit 572 (step S1008). The number of pieces of updated firmware is also decided by this decision.

Next, the FW operation verifying unit 530 of the server 500 conducts an operation verification of the updated firmware decided in step S1008, in an environment made up of ECUs of the same type as each ECU indicated by the received system configuration information (step S1009). As for the updated firmware, firmware stored in the FW storing unit 571 is used. In the case in which the operation verification ends appropriately in step S1009, or in other words, in the case in which an update applying the updated firmware to each relevant target ECU in an environment made up of the types of ECUs is performed, and each ECU is confirmed to operate appropriately after updating, the delivery data generating unit 570 of the server 500 generates FW update information (see FIG. 10). In other words, the delivery data generating unit 570 repeats, for a number of times equal to the number of pieces of updated firmware (step S1010), the acquisition of FW data such as firmware stored by the FW storing unit 571 (step S1011) and the attachment of a FW data signature generated by the signature generating unit 590 to the FW data (step S1012). Also, the delivery data generating unit 570 causes the signature generating unit 590 to generate a signature for the FW update information (FW update information signature) (step S1013), and generates FW update information with the signature attached.

In the server 500, after the FW update information is generated, the FW update controlling unit 520 causes the data transmitting and receiving unit 510 to transmit the FW update information (step S1014). With this arrangement, FW update information is transmitted from the server 500 to the gateway 300 from which originated the transmission of system configuration information as a FW update request, and the gateway 300 receives the FW update information. Step S1014 is a receiving step, performed in the gateway 300, that receives FW update information including updated firmware for updating at least one ECU from the server 500.

After receiving the FW update information, the gateway 300 verifies the signature of the FW update information (FW update information signature) with the signature verifying unit 373 (step S1015). Subsequently, the FW update processing unit 370 of the gateway 300 determines whether or not the signature verification is successful (step S1016), and if verification is unsuccessful, discards the FW update information (step S1017). In this case, a firmware update based on the FW update information is not conducted. If the verification is successful, the gateway 300 conducts a FW update control process with the FW update processing unit 370 acting as the agent, in conjunction with the relevant ECU to update (step S1018). The content of the FW update control process will be discussed later. Step S1018 and the like is an update processing step in which the gateway 300 controls the updating of firmware in each relevant ECU based on updated firmware, after an operation verification of the updated firmware is performed using each type of ECU indicated by the system configuration information.

After finishing the FW update control process in step S1018, or after discarding the FW update information in step S1017, the gateway 300 transmits a firmware update result to the server 500 (step S1019). The firmware update result is information indicating whether or not the update is successful, for example, and this information may include a FW version related to the firmware after the update, for example. By this arrangement, the server 500 receives an update result.

In the case of receiving a firmware update result, the server 500 updates the vehicle ECU management information stored by the ECU management information storing unit 572 to indicate the updated state of the relevant firmware (step S1020).

[1.12 Example FW Update Control Process by Gateway 300]

Figure 13:
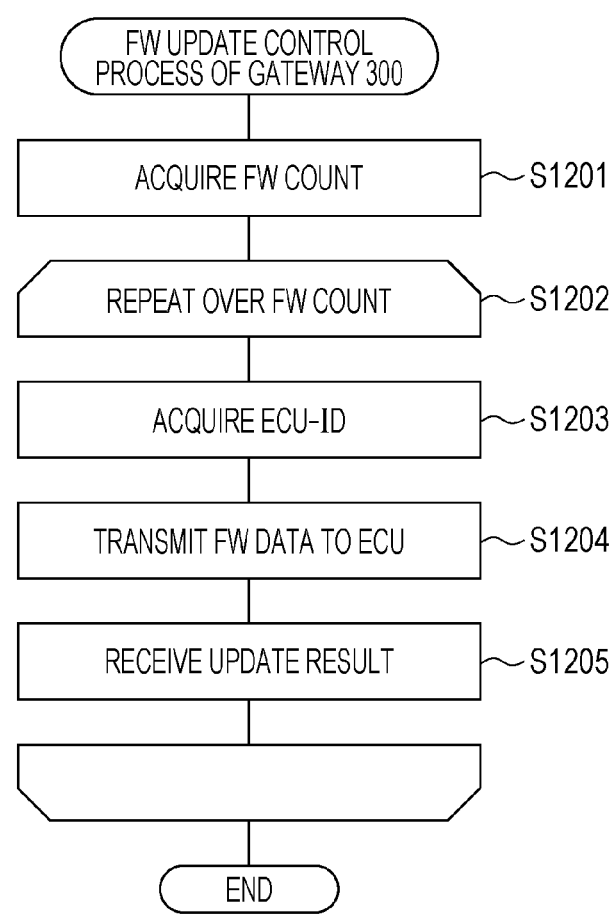
FIG. 13 is a flowchart illustrating an example of a FW update control process by a gateway according to Embodiment 1.

FIG. 13 is a flowchart illustrating an example of the FW update control process by the gateway 300.

Hereinafter, the FW update control process executed by the gateway 300 in the above step S1018 will be described with reference to FIG. 13.

The gateway 300 uses the FW update processing unit 370 to acquire the FW count in the FW update information (see FIG. 10) (step S1201), and repeats the process from step S1203 to step S1205 a number of times equal to the FW count (step S1202).

The FW update processing unit 370 acquires the ECU-ID in the FW data of the FW update information (step S1203).

Next, in the gateway 300, the FW update processing unit 370 causes the frame generating unit 380 to generate a frame including FW data to transmit to the ECU identified by the ECU-ID, and the frame transmitting and receiving unit 310 transmits the frame to the ECU via the bus to which the ECU is connected (step S1204). With this arrangement, the ECU identified by the ECU-ID in the FW data receives the FW data, conducts a process for updating the firmware, and transmits the update result to the gateway 300.

The gateway 300 receives the update result transmitted from the ECU (step S1205).

[1.13 Example FW Update Control Process by ECU 100a]

Figure 14:
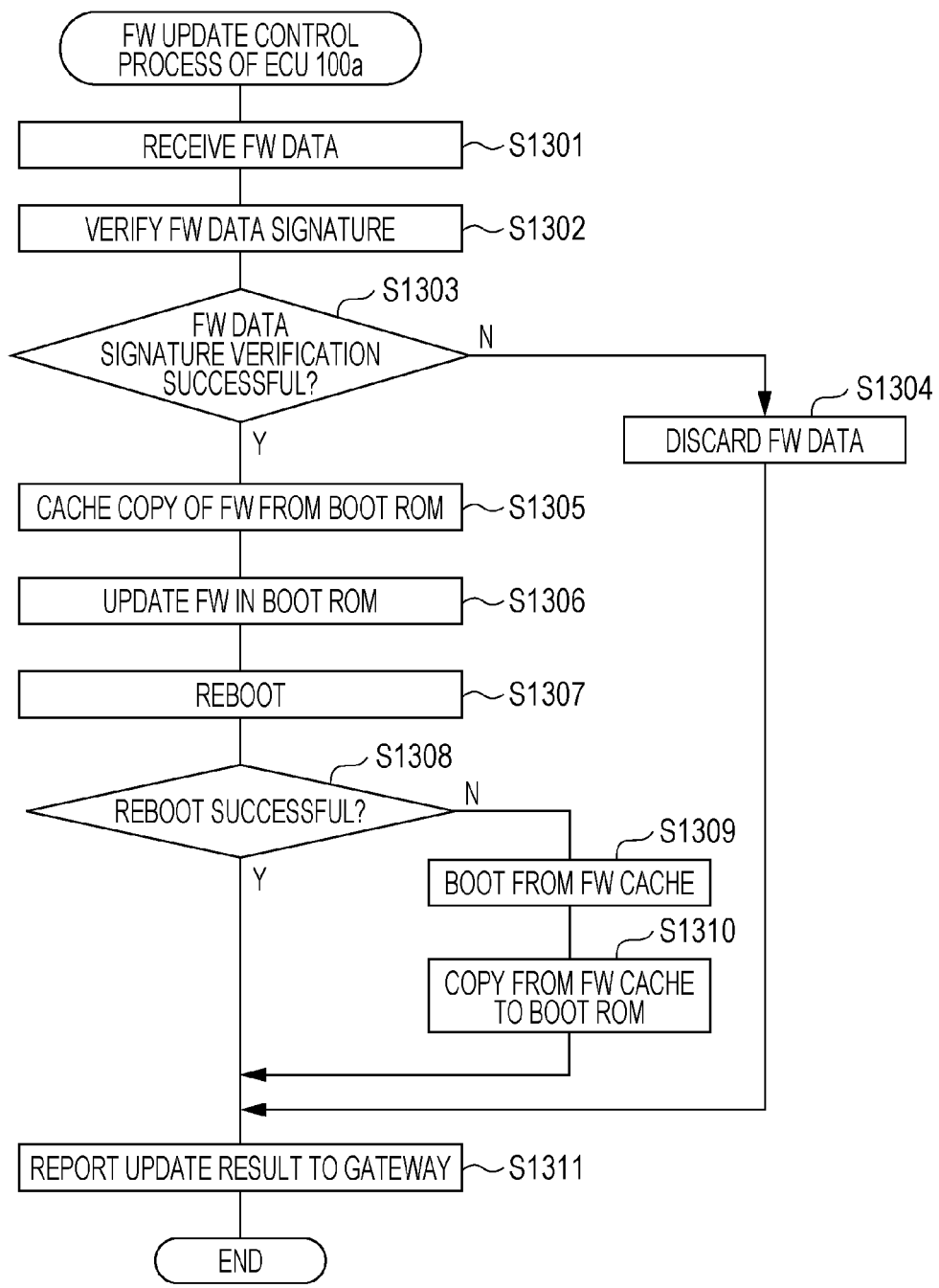
FIG. 14 is a flowchart illustrating an example of a FW update control process by an ECU according to Embodiment 1.

FIG. 14 is a flowchart illustrating an example of the FW update control process by the ECU 100a.

Hereinafter, the FW update control process conducted by the ECU 100a in the case in which the ECU 100a is the ECU to which the FW data is transmitted from the gateway 300 in the above step S1204 will be described with reference to FIG. 14.

In the ECU 100a, the frame transmitting and receiving unit 110 receives a frame including FW data (step S1301).

The FW update processing unit 160 of the ECU 100a acquires FW data from the frame received in step S1301 via the frame interpreting unit 120 and the frame processing unit 150, and causes the signature verifying unit 163 to verify the FW data signature in the FW data (step S1302).

The FW update processing unit 160 determines whether or not the verification of the FW data signature is successful (step S1303), and if unsuccessful, discards the FW data (step S1304), and does not conduct the firmware update.

If the verification of the FW data signature is successful, the FW update processing unit 160 saves the firmware, that is, the content of the boot ROM in the ECU 100a, by copying the firmware to the FW cache storing unit 161 (step S1305).

Next, the FW update processing unit 160 updates the firmware inside the boot ROM with the firmware (FW) in the FW data (step S1306), and reboots by resetting the processor of the ECU 100a (step S1307).

The ECU 100a is preconfigured to boot from the contents of the FW cache storing unit 161 if booting from the boot ROM is unsuccessful, and thus if the reboot in step S1307 is unsuccessful (step S1308), the ECU 100a boots from the pre-update firmware saved in the FW cache storing unit 161 (step S1309). Subsequently, under the control of the pre-update firmware, the pre-update firmware saved in the FW cache storing unit 161 is copied to the boot ROM, thereby reverting the contents of the boot ROM back to the pre-update state (step S1310).

If the reboot in step S1307 is successful, the ECU 100a transmits to the gateway 300 a frame including an update result indicating that the firmware update has succeeded, whereas if the reboot in step S1307 is unsuccessful, after step S1310, the ECU 100a transmits to the gateway 300 a frame including an update result indicating that the firmware update failed (step S1311).

[1.14 Advantageous Effects of Embodiment 1]

In the on-board network system 10 according to Embodiment 1, the gateway 300 collects, and saves as system configuration information, ECU information indicating the ECU type and the like for all ECUs connected to the on-board network (buses 200a and 200b). Subsequently, the gateway 300 reports the system configuration information to the server 500. With this arrangement, in the server 500, it is possible to determine whether or not a firmware update is necessary for one or more ECUs on the on-board network of the vehicle provided with the gateway 300, and decide the firmware to be updated. In the server 500, an operation verification related to the updating of the firmware to be updated (such as a verification of whether or not the firmware update can be conducted appropriately and a verification of whether or not each ECU operates appropriately after the update) is conducted in an environment organized with the same types of ECUs (an environment made up of real ECUs or an environment made up of simulated ECUs) corresponding to the organization of the ECUs indicated by the system configuration information. In the server 500, after the operation verification is conducted successfully (after appropriate operation is confirmed), FW update information including the firmware to be updated is transmitted to the gateway 300, and thus the gateway 300 becomes able to acquire firmware whose operation has been verified in an environment corresponding to the environment made up of the respective ECUs in that vehicle. For this reason, the possibility of the vehicle ceasing to function correctly after updating the firmware in the vehicle is reduced.

(Embodiment 2)

Hereinafter, an on-board network system 11, which is a partial modification of the on-board network system 10 indicated in Embodiment 1, will be described.

In the on-board network system 11 according to the present embodiment, to update ECU firmware in each of multiple vehicles efficiently, a firmware update method is used in which a server transmits firmware after conducting an operation verification in each ECU inside a vehicle corresponding to each vehicle model. With this firmware update method, a method is used in which the gateway device inside the vehicle receives verified configuration information (verified ECU configuration information) indicating the ECU organization (such as the type of each ECU) used in the operation verification for the firmware transmitted from the server together with the firmware, and compares the verified configuration information to the ECU configuration inside the vehicle to thereby confirm whether or not an operation verification corresponding to the vehicle itself has been conducted.

[2.1 Overall Configuration of On-Board Network System 11]

The on-board network system 11 is configured to include ECUs 100a to 100d connected to various equipment on-board the vehicle, buses 200a and 200b, a gateway 300a, as well as a network 400 and a server 500a outside the vehicle. The on-board network system 11 is obtained by replacing the gateway 300 and the server 500 in the on-board network system 10 indicated in Embodiment 1 (see FIG. 1) with the gateway 300a and the server 500a. Regarding points not described herein, the on-board network system 11 is similar to the on-board network system 10.

[2.2 Configuration of Gateway 300a]

The gateway 300a is a type of ECU that acts as a gateway device connecting the bus 200a, to which the ECU 100a and the ECU 100b are connected, and the bus 200b, to which the ECU 100c and the ECU 100d are connected. The gateway 300a includes a function of forwarding a frame received from one bus to the other bus, and also includes a function of communicating with the server 500a via the network 400.

Figure 15:
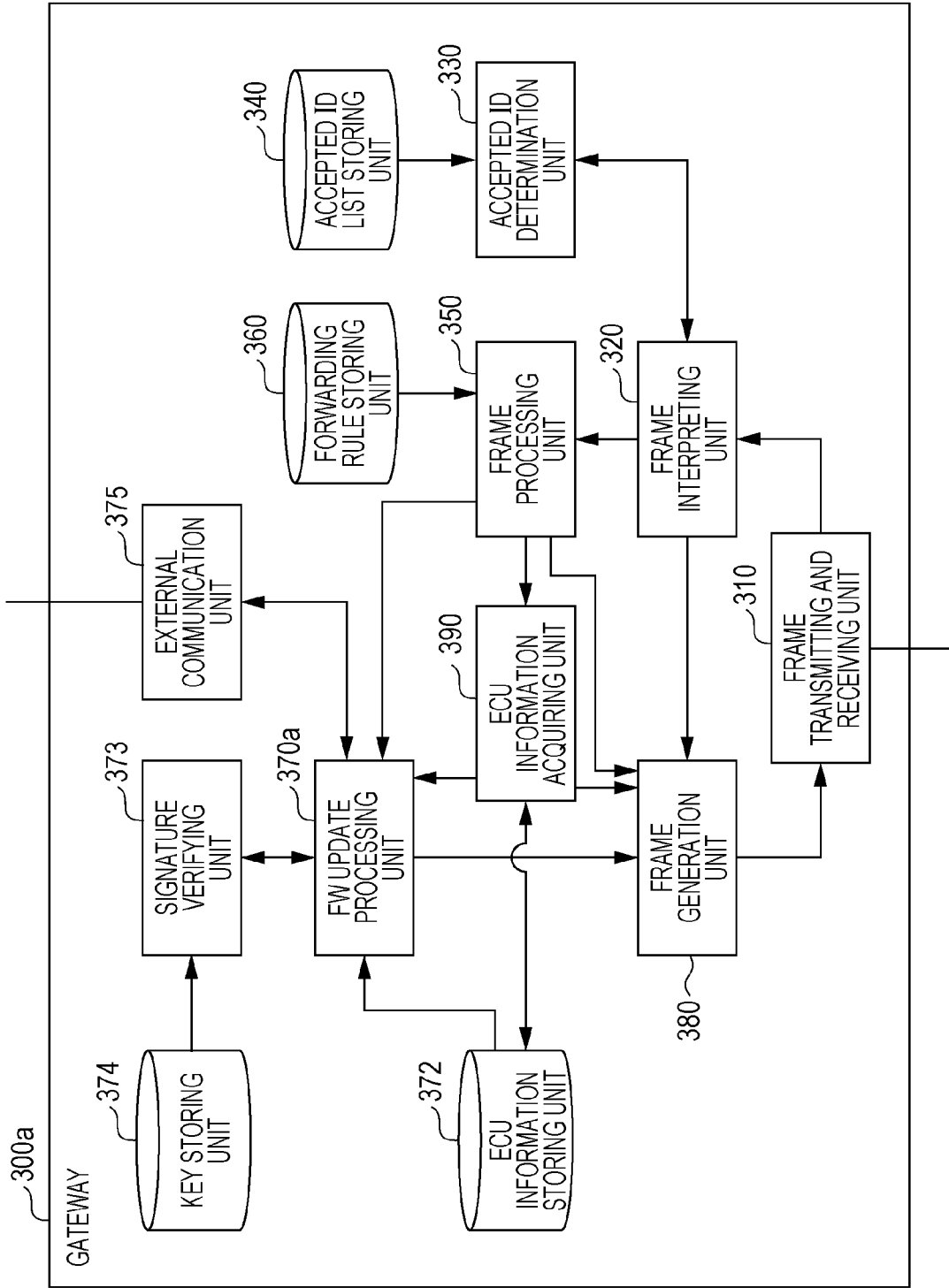
FIG. 15 is a configuration diagram of a gateway according to Embodiment 2.

FIG. 15 is a configuration diagram of the gateway 300a. The gateway 300a is obtained by replacing the FW update processing unit 370 in the gateway 300 indicated in Embodiment 1 with a FW update processing unit 370a. As illustrated in FIG. 15, the gateway 300a is configured to include a frame transmitting and receiving unit 310, a frame interpreting unit 320, an accepted ID determining unit 330, an accepted ID list storing unit 340, a frame processing unit 350, a forwarding rule storing unit 360, a FW update processing unit 370a, an ECU information storing unit 372, a signature verifying unit 373, a key storing unit 374, an external communication unit 375, a frame generating unit 380, and an ECU information acquiring unit 390. These respective component elements are realized by components in the gateway 300a, such as a communication circuit, a processor that executes a control program stored in memory, or a digital circuit. Among the component elements of the gateway 300a, component elements which are similar to the those of the gateway 300 described above (see FIG. 3) are denoted with the same signs in FIG. 15, and the description thereof will be reduced or omitted.

The FW update processing unit 370 requests the signature verifying unit 373 for a signature verification of FW update information (see FIG. 16) including FW data such as updated firmware reported by the external communication unit 375, and if the signature verification is successful, confirms that an operation verification of the firmware has been performed appropriately. The confirmation that an operation verification has been performed appropriately is conducted by comparing the system configuration information, that is, the set of ECU information for each ECU stored in the ECU information storing unit 372 and acquired by the ECU information acquiring unit 390, to the verified ECU configuration information included in the FW update information. Note that in the case in which FW update processing unit 370a is notified of FW update information from the external communication unit 375, the FW update processing unit 370a may also first cause the ECU information acquiring unit 390 to collect ECU information about each ECU, and then conduct the confirmation that an operation verification has been performed appropriately. The verified ECU configuration information is information that indicates information such as the type of each ECU constituting the environment used in the operation verification of the firmware included in the FW update information in the server 500a. The ECU type is specified by the ECU-ID and the FW version, such as a version number, of the firmware implemented in the ECU.

The FW update processing unit 370a compares the type of each ECU provided on-board the vehicle as indicated by the system configuration information to the type of each ECU used in the operation verification as indicated by the verified ECU configuration information in the FW update information received from the server 500a, and in the case in which the comparison result satisfies a certain condition, the FW update processing unit 370a conducts control for performing an update based on the updated firmware included in the FW update information. The certain condition is, for example, that all ECU types indicated by the system configuration information completely match all ECU types indicated by the verified ECU configuration information. Regarding the control for performing an update based on the updated firmware, the FW update processing unit 370a reports to the frame generating unit 380 the FW data related to the updated firmware and the bus information about the bus to which is connected the ECU to be updated. Note that in the case in which there are multiple ECUs to be updated, update sequence information is included in the verified ECU configuration information in the FW update information, and thus the FW update processing unit 370a conducts control for performing firmware updates following the sequence indicated by the update sequence information.

Additionally, the FW update processing unit 370a reports to the external communication unit 375 an update result reported by the frame processing unit 350. In addition, in the case in which the comparison result between the type of each ECU indicated by the system configuration information and the type of each ECU indicated by the verified ECU configuration information does not satisfy the certain condition described above, the FW update processing unit 370a aborts the firmware update, and reports the system configuration information to the external communication unit 375 as an operation verification request. Information specifying the firmware that was being attempted to update is added to the operation verification request, for example. In the case in which an operation verification is performed on the server 500a in response to the operation verification request, and FW update information including verified ECU configuration information satisfying the certain condition described above is transmitted from the server 500a, the FW update processing unit 370a acquires the FW update information and resumes the firmware update. Note that the FW update processing unit 370a functions as an update processing unit that receives FW update information including FW data such as updated firmware after an operation verification of the updated firmware is performed using various types of ECUs indicated by the system configuration information, and in the case of a successful signature verification, finally controls the updating of the firmware for the relevant ECUs (such as transmitting FW data to an ECU via a bus, for example). Additionally, the FW update processing unit 370a reports to the frame generating unit 380 data necessary to communicate with the ECUs 100a to 100d.

The external communication unit 375 receives and reports to the FW update processing unit 370a FW update information including FW data related to the updated firmware from the server 500a, and transmits an update result reported from the FW update processing unit 370a to the server 500a. Additionally, the external communication unit 375 transmits system configuration information reported from the FW update processing unit 370a to the server 500a as an operation verification request. The external communication unit 375 stores in advance address information of the server 500a needed to access the server 500a via the network 400, for example. Note that the external communication unit 375 may also transmit a firmware update request to the server 500a.

[2.3 FW Update Information Format Example]

Figure 16:
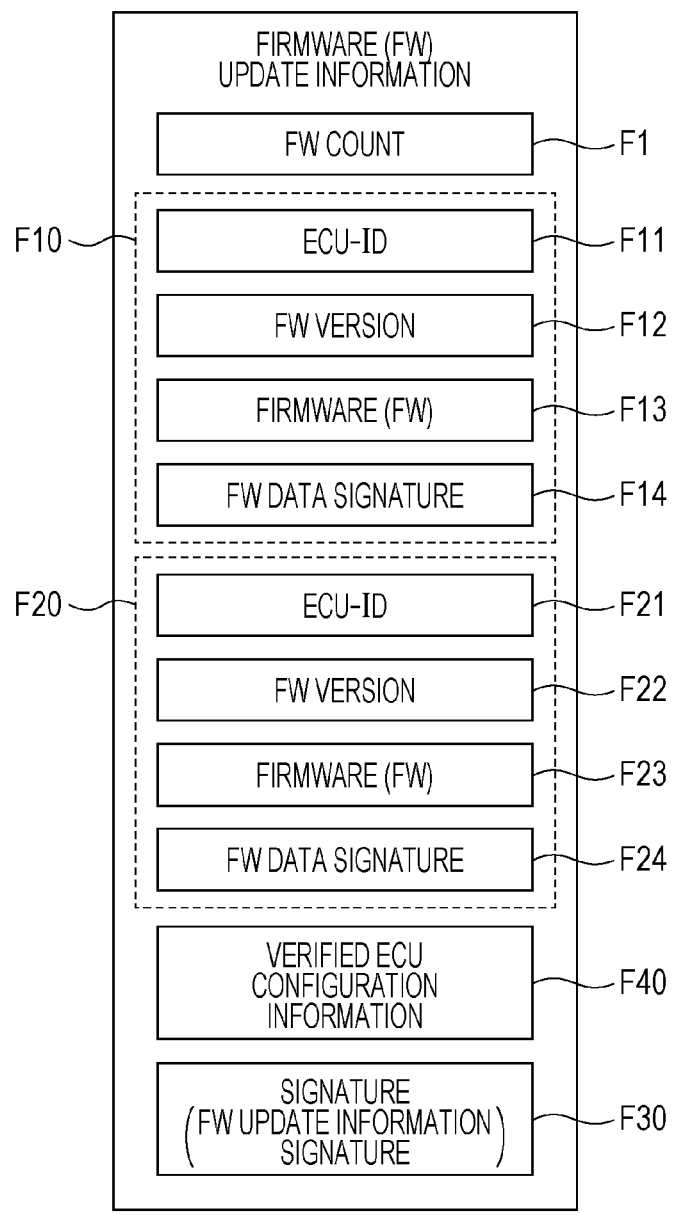
FIG. 16 is a diagram illustrating an example of the format of FW update information according to Embodiment 2.

FIG. 16 illustrates an example of the format of FW update information as delivery data that the server 500a delivers.

The FW update information delivered by the server 500a is the FW update information delivered by the server 500 indicated in Embodiment 1 (see FIG. 10), with the addition of verified ECU configuration information F40.

In other words, the FW update information delivered by the server 500a includes a FW count F1, one or more pieces of FW data (in the example of FIG. 16, two pieces of individual FW data F10 and F20), verified ECU configuration information F40, and a FW update information signature F30, which is a signature for the FW update information as a whole.

[2.4 Verified ECU Configuration Information Format Example]

Figure 17:
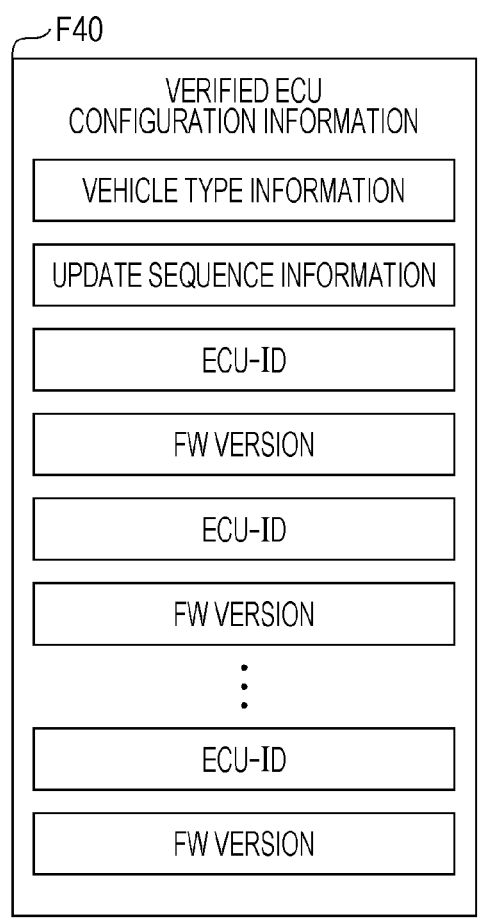
FIG. 17 is a diagram illustrating an example of the format of ECU configuration information according to Embodiment 2.

FIG. 17 illustrates an example of the format of the verified ECU configuration information F40.

The verified ECU configuration information F40 is information about the ECUs used in the operation verification of firmware in the server 500a. The verified ECU configuration information F40 includes vehicle type information that identifies the vehicle model, update sequence information indicating the update sequence of the firmware used in the operation verification (an update sequence by which firmware can be updated without problems), the ECU-ID of each ECU used in the operation verification, and a FW version, such as a version number, of the firmware implemented in the ECU.

[2.5 Configuration of Server 500a]

The server 500a is a computer that includes a function of delivering via the network 400 FW update information (see FIG. 16), which is data for updating the firmware of the ECUs 100a to 100d.

Presupposing that multiple ECUs related to an on-board network are installed on-board each of multiple vehicles, the server 500a includes a function of managing the firmware provided by the manufacturing companies or the like of various ECUs, conducting a firmware operation verification, and delivering FW update information including updated firmware to each vehicle.

Figure 18:
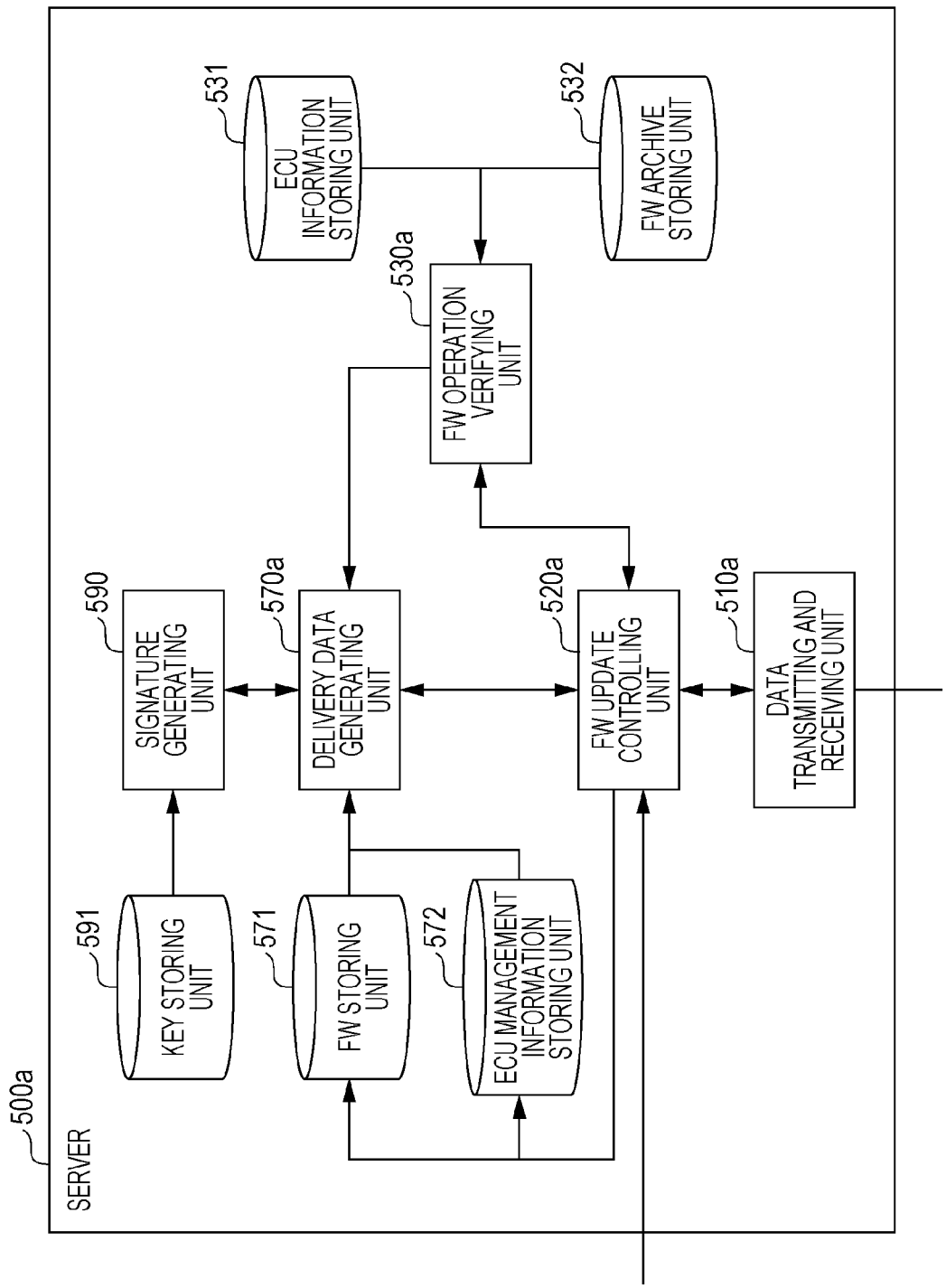
FIG. 18 is a configuration diagram of a server according to Embodiment 2.

FIG. 18 is a configuration diagram of the server 500a. As illustrated in the diagram, the server 500a is configured to include a data transmitting and receiving unit 510a, a FW update controlling unit 520a, a FW operation verifying unit 530a, an ECU information storing unit 531, a FW archive storing unit 532, a delivery data generating unit 570a, a FW storing unit 571, an ECU management information storing unit 572, a signature generating unit 590, and a key storing unit 591. These respective component elements are realized by components in the server 500a, such as a communication circuit, or a processor that executes a control program stored in memory. Among the component elements of the server 500a, component elements which are similar to the those of the server 500a described above (see FIG. 8) are denoted with the same signs in FIG. 18, and the description thereof will be reduced or omitted.

The data transmitting and receiving unit 510a communicates with the gateway 300a to transmit and receive data. In the case of receiving system configuration information as a request for an operation verification of firmware (operation verification request) from the gateway 300a, the data transmitting and receiving unit 510a notifies the FW update controlling unit 520a, and in the case of receiving FW update information for the delivery of firmware from the FW update controlling unit 520a, the data transmitting and receiving unit 510a transmits the FW update information to the gateway 300a. In the case of receiving a firmware update result from the gateway 300a, the data transmitting and receiving unit 510a notifies the FW update controlling unit 520a. Note that in the case in which the gateway 300a makes the request for the update of firmware, the data transmitting and receiving unit 510a notifies the FW update controlling unit 520a in the case of receiving a request for the update of firmware from the gateway 300a.

In the case in which the most recent (in other words, updated) firmware for an ECU is uploaded to the server 500a from a terminal device at the manufacturing company of the ECU or the like, and a firmware registration request is made, the FW update controlling unit 520a cooperates with the FW operation verifying unit 530a and the like to conduct a registration process after first conducting an operation verification of the firmware. To conduct the operation verification, first, on the basis of information from the terminal device, the FW update controlling unit 520a specifies the ECU on which operates the updated firmware that has been uploaded, and in addition, specifies the vehicle model of a vehicle provided with (using) the specified ECU. To specify the vehicle model using the ECU that requires a firmware update, the FW update controlling unit 520a stores an ECU vehicle model management table as exemplified in FIG. 19, for example, and by referencing this ECU vehicle model management table, specifies the vehicle model corresponding to the ECU-ID of the ECU that requires a firmware update. The ECU vehicle model management table is a table associating the ECU-ID or the like with the vehicle model. The vehicle model is identification information identifying the vehicle structure or the like, and may be information such as a model code, for example. Additionally, the FW update controlling unit 520a uses a vehicle model ECU management table as exemplified in FIG. 20, for example, to generate a list of all ECUs used by the vehicle model provided with the ECU that requires a firmware update. The vehicle model ECU management table is a table associating each vehicle model with identification information (such as the ECU-ID) for all ECUs provided on-board a vehicle of the corresponding vehicle model. The FW update controlling unit 520a reports the generated list to the FW operation verifying unit 530a, and causes the FW operation verifying unit 530a to use an environment made up of all ECUs listed on the list to conduct an operation verification of the firmware update. After the operation verification ends and problem-free operation has been confirmed, the FW update controlling unit 520a stores the uploaded firmware in the FW storing unit 571, and on the basis of information from the terminal devices, manages the firmware in association with information such as the FW version indicating a version number or the like, and information indicating the type of the target ECU. Additionally, after the operation verification by the FW operation verifying unit 530a ends, the FW update controlling unit 520a causes the delivery data generating unit 570a to generate FW update information as a package of updated firmware including the firmware whose operation has been verified. This FW update information acts as the delivery data to multiple vehicles (specifically, to the gateway 300a of each vehicle). The FW update controlling unit 520a causes the data transmitting and receiving unit 510a to transmit the FW update information generated by the delivery data generating unit 570a to the gateway 300a.

In addition, in the case of receiving a request for the update of firmware from the gateway 300a via the data transmitting and receiving unit 510a, the FW update controlling unit 520a causes the delivery data generating unit 570a to generate, and transmit to the gateway 300a, FW update information including updated firmware corresponding to the gateway 300a, the firmware having been verified by the FW operation verifying unit 530a to operate without problems. Additionally, in the case of acquiring system configuration information as an operation verification request from the gateway 300a via the data transmitting and receiving unit 510a, the FW update controlling unit 520a requests the FW operation verifying unit 530a for an operation verification of the updated firmware, and after an operation verification is performed (in other words, after the updated firmware is verified to operate appropriately without problems), the FW update controlling unit 520a causes the data transmitting and receiving unit 510a to transmit FW update information. Note that the FW update information transmitted to the gateway 300a by the server 500a always includes verified ECU configuration information indicating information about the ECUs used in the operation verification by the FW operation verifying unit 530a, as illustrated in FIG. 16. Also, in the case of receiving a firmware update result from the gateway 300a, the FW update controlling unit 520a updates vehicle ECU management information stored by the ECU management information storing unit 572.

The FW operation verifying unit 530a includes a function of executing a FW operation verification process for verifying that the updated firmware and the firmware of each ECU in an operating environment are operating appropriately (correctly), the operating environment being configured with the ECUs indicated by the list that lists ECUs, or with ECUs of the same type as each of the ECUs indicated by the system configuration information, received in the request from the FW update controlling unit 520a. In the FW operation verification process, operations such as an update operation of applying updated firmware to an ECU to be updated in the operating environment, and an operation of determining whether or not each ECU in the operating environment is operating correctly after the update, are verified, for example. In the FW operation verification process, operation verification of the updated firmware may be conducted by using the hardware of various ECUs as the operating environment, or operation verification of the updated firmware may be conducted by simulation in a virtual environment that simulates various ECUs.

The delivery data generating unit 570a generates FW update information (see FIG. 16) as a package of updated firmware to be delivered to the gateway 300a, and requests the signature generating unit 590 to generate a signature for the FW update information. Note that the delivery data generating unit 570a acquires information (such as the ECU-ID and the FW version) about all ECUs used as the operating environment of the firmware verified to operate appropriately from the FW operation verifying unit 530a, and sets verified ECU configuration information in the FW update information.

The FW storing unit 571 stores firmware for ECUs that has been uploaded and subjected to operation verification.

[2.6 Example Operations Related to Registering Updated Firmware in Server]

Figures 19, 20, 21:
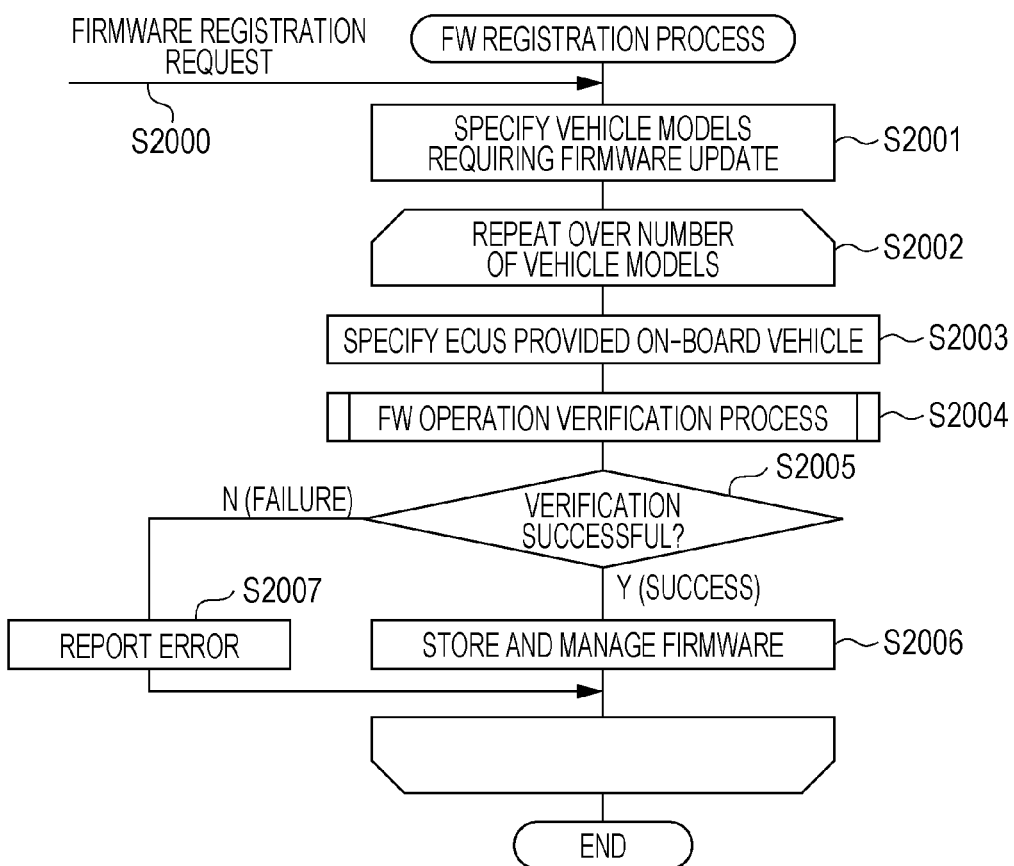
FIG. 19 is a diagram illustrating an example of an ECU vehicle model management table according to Embodiment 2.
FIG. 20 is a diagram illustrating an example of a vehicle model ECU management table according to Embodiment 2.
FIG. 21 is a flowchart illustrating a FW registration process related to the registration of updated firmware by a server according to Embodiment 2.

FIG. 21 is a flowchart illustrating a FW registration process related to the registration of updated firmware by the server 500a. Hereinafter, the FW registration process by the server 500a will be described by following the diagram. The FW registration process is executed in the case in which firmware is transmitted and a firmware registration request is issued from a terminal device external to the server 500a over a network.

First, the server 500a receives the firmware registration request issued together with the uploading of firmware to the server 500a (step S2000). The firmware registration request includes a FW version indicating a serial number or the like of the firmware, and information indicating the ECU-ID of the target ECU for the firmware, for example.

The server 500a receiving the registration request specifies vehicle models for which a firmware update is required (step S2001). In other words, the server 500a acquires the ECU-ID of ECUs requiring update from the information included in the received firmware registration request, references an ECU vehicle model management table as exemplified in FIG. 19, and specifies the vehicle models provided with the ECU identified by the ECU-ID included in the registration request.

For each vehicle model specified in step S2001, the server 500a executes a firmware operation verification process (steps S2003 to S2007) in an operating environment made up of the ECUs used in that vehicle model (step S2002). First, the server 500a references the vehicle model ECU management table (see FIG. 20) to specify the ECUs provided on-board the relevant vehicle model, and generates a list of information (ECU-ID) for all specified ECUs (step S2003). Subsequently, operation verification of the firmware to be updated (a FW operation verification process) is conducted in an operating environment configured using the ECUs indicated in the list (step S2004). This operation verification confirms whether the firmware to be updated operates correctly in an environment made up of the ECUs provided on-board the relevant vehicle model, and also whether the other ECUs operate correctly when updating the firmware for the ECU targeted by the update.

After the operation verification, the server 500a determines whether or not the operation verification is successful (step S2005). In the case of determining in step S2005 that the operation verification is successful, the server 500a stores and manages the firmware in the FW storing unit 571 (step S2006). On the other hand, in the case of determining in step S2005 that the operation verification has failed, the server 500a reports an error to the terminal device that transmitted the firmware registration request in step S2000 (step S2007).

[2.7 FW Operation Verification Process]

Figure 22:
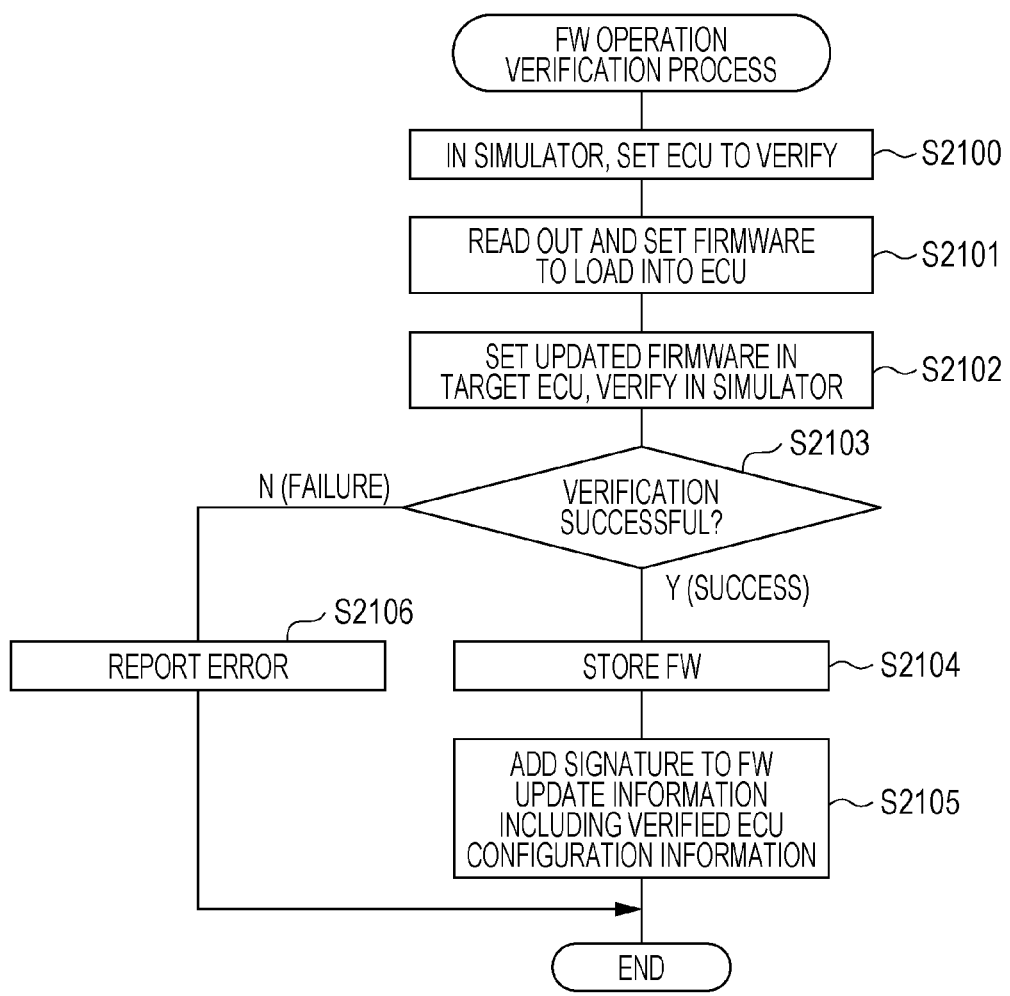
FIG. 22 is a flowchart illustrating an example of a FW operation verification process by a server according to Embodiment 2.

FIG. 22 is a flowchart illustrating a FW operation verification process by the server 500a. The FW operation verification process is executed mainly by the FW operation verifying unit 530a and the like inside the server 500a as part (step S2004) of the FW registration process described above (see FIG. 21). In addition, the FW operation verification process is also a process conducted separately in a case of receiving an operation verification request based on system configuration information from the gateway 300a. Generally, the FW operation verification process is a process that verifies the operation of updated firmware in an environment configured using an ECU group indicated in a list from the FW update controlling unit 520a, or an ECU group of the same types as the ECUs indicated by system configuration information acquired from the gateway 300a. Hereinafter, the FW operation verification process will be described by following FIG. 22.

The FW operation verifying unit 530a references ECU-IDs indicated by the received list or ECU-IDs or the like indicated by the system configuration information, and sets information about each ECU that should be used in the operation verification in a simulator 800 (step S2100). The simulator 800 is a computer controllable by the FW operation verifying unit 530a, and is able to simulate various types of ECUs. The configuration made up of the FW operation verifying unit 530a and the simulator 800 operates as a simulation unit that simulates multiple ECUs. In step S2100, the FW operation verifying unit 530a sets information about each ECU that should be used in the operation verification in the simulator 800, on the basis of information (software) for simulating various ECUs stored in the ECU information storing unit 531, and the latest firmware. Note that the information for simulating various ECUs stored by the ECU information storing unit 531 may include, for example, information related to the processor and memory inside each ECU (such as the clock speed and memory size), information related to the CAN controller inside each ECU (such as the model number and clock speed), information regarding the bus connected to each ECU or a communication link used by each ECU, and information about actuators and sensors connected to each ECU (information about rotary encoders, torque sensors, motors, and the like). By setting this information in the simulator 800, it becomes possible to simulate the ECUs and the in-vehicle network for each vehicle model.

Next, the FW operation verifying unit 530a selects the firmware to set in each ECU simulated by the simulator 800 from among all firmware corresponding to various ECUs stored in the FW archive storing unit 532, and sets information about the selected firmware in the simulator 800 (step S2101). Note that pre-update firmware is also set with respect to the ECU targeted for the firmware update.

Next, the FW operation verifying unit 530a uses the simulator 800 to simulate an update of setting the updated firmware in the target ECU and simulate the operation of each ECU after updating, to thereby conduct an operation verification of the updated firmware (step S2102). With this arrangement, a simulation of the update applying the updated firmware and the subsequent operation is executed by the simulator 800 in an operating environment that simulates ECUs of the same type as the ECUs specified by the list or the system configuration information reported from the FW update controlling unit 520a, and an operation verification that verifies whether the ECUs are operating correctly is realized.

After the operation verification, the FW operation verifying unit 530a determines whether or not the operation verification is successful (step S2103). In the case of determining in step S2103 that the operation verification is successful, the FW operation verifying unit 530a stores the firmware subjected to the operation verification in the FW archive storing unit 532 (step S2104). Note that when the FW operation verification process is conducted on the basis of an operation verification request from the gateway 300a, the processing in step S2104 is omitted.

Additionally, the FW operation verifying unit 530a transmits information (such as ECU-ID and FW version) about all ECUs used in the operation verification to the FW update controlling unit 520a, and the FW update controlling unit 520a causes the delivery data generating unit 570a to generate FW update information including the information about the ECUs used in the operation verification as verified ECU configuration information, and also including the FW data of the firmware subjected to the operation verification. In the delivery data generating unit 570a, the signature generating unit 590 generates a signature for the FW update information including the verified ECU configuration information, and includes the generated signature in the FW update information as a FW update information signature (step S2105). Also, in the case of determining in step S2103 that the operation verification is not successful, the FW operation verifying unit 530a reports an error to the FW update controlling unit 520a (step S2106), and the FW update controlling unit 520a receiving this error aborts processing related to the generation of FW update information.

Note that the verified ECU configuration information may include not only information related to each ECU itself, but also information related to the state of each ECU when an operation verification is conducted. Examples of this information include the rewriting time (length of process) when updating from the current version of firmware to new firmware, the time until the ECU becomes operational after rewriting, the rewriting process load, the time during which sensor information and messages on the on-board network cannot be received, the IDs of messages which cannot be receiving while rewriting, and the memory size used by the firmware after rewriting, for example. From this information, the gateway 300a and each ECU may also determine the timing at which to conduct the firmware updating process. For example, a determination may be made so that the firmware is updated during a time period known in advance to be a time period in which the vehicle (automobile) is not used for a long period of time, such as at night, so that the driver, an administrator of the automobile, or the like is notified of a time when updating is required, and the firmware is updated only when permitted, so that the driver, an administrator of the automobile, or the like is queried for a time during which the automobile will not be used or driven, and only firmware that would fit into that time is updated, or the like. With this arrangement, flexible firmware updates become realizable.

[2.8 FW Operation Verification Process Related to Verification of Multiple Pieces of Updated Firmware]

Figure 23:
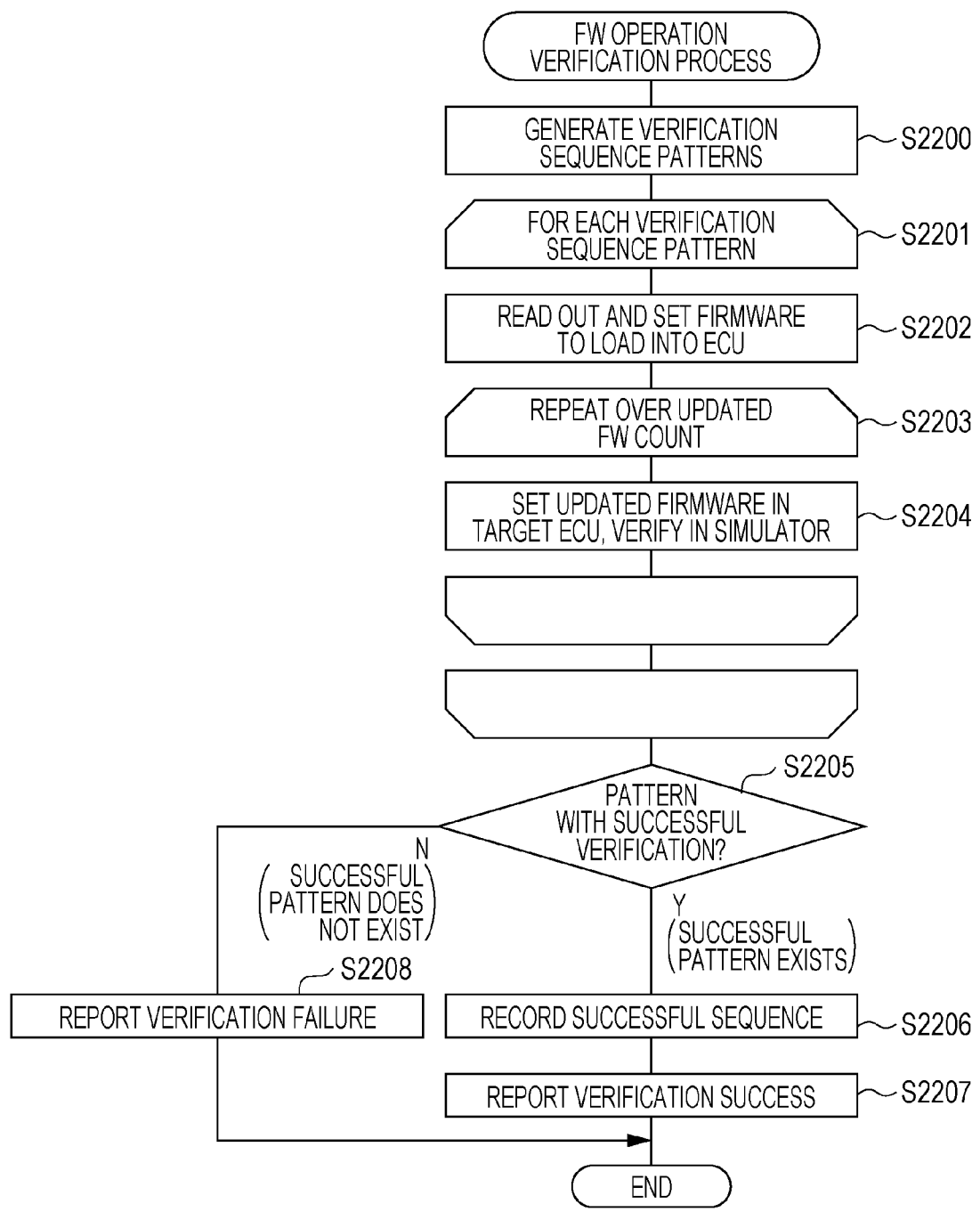
FIG. 23 is a flowchart illustrating an example of a FW operation verification process related to the verification of multiple pieces of firmware by a server according to Embodiment 2.

FIG. 23 is a flowchart illustrating an example of a FW operation verification process related to the verification of multiple pieces of firmware by the server 500a.

FIG. 23 focuses on a process of conducting an operation verification for each of multiple verification sequence patterns in which multiple pieces of firmware are updated in a different order (that is, a verification sequence), and specifying a verification sequence by which verification is successful. Other processes are omitted from illustration. In other words, FIG. 23 illustrates a process that acts as a substitute for step S2101 and step S2102 illustrated in FIG. 22, while other processes are omitted from illustration. Hereinafter, operations for verifying multiple pieces of firmware by the server 500a will be described by following FIG. 23.

First, the FW operation verifying unit 530a, after conducting the process in step S2100 illustrated in FIG. 22, generates verification sequence patterns, each of which indicates an order in which to verify multiple pieces of updated firmware (step S2200). For each generated verification sequence pattern, the FW operation verifying unit 530a repeatedly executes the process from step S2201 to step S2204. The verification sequence pattern used in each repeated instance of steps S2201 to S2204 is designated the "target verification sequence pattern".

First, the FW operation verifying unit 530a reads out, from the FW archive storing unit 532, firmware to be operated on each of the ECUs set in the simulator 800, and sets the firmware in the ECUs of the simulator 800 (step S2202). Step S2202 is the same process as step S2101. After that, the process of step S2204 is repeated for each of the multiple pieces of updated firmware (step S2203). At this point, the FW operation verifying unit 530a conducts the operation verification in step S2204 on each of the multiple pieces of updated firmware, while following the order indicated by the target verification sequence pattern. In step S2204, the FW operation verifying unit 530a executes the simulator 800 with the updated firmware set in the ECU to be updated, and verifies whether the ECU operates correctly. Every time one piece of updated firmware is set in one ECU in the simulator 800, the FW operation verifying unit 530a verifies whether the ECU operates correctly. Operation verification for the target verification sequence pattern is determined to be successful only in the case in which the setting of firmware in an ECU and the operation verification is completed for all pieces of updated firmware, and all operation verifications are successful.

After operation verification ends for all verification sequence patterns, the FW operation verifying unit 530a determines whether or not a verification sequence pattern determined to have a successful operation verification exists among the tested verification sequence patterns (step S2205). In the case of determining in step S2205 that a pattern having a successful operation verification exists, the FW operation verifying unit 530a records the verification sequence pattern having the successful operation verification as update sequence information (step S2206). Additionally, an operation verification result, which includes update sequence information and the like, includes information (such as the ECU-ID and FW version) about all ECUs used in the operation verification, and additionally indicates that the operation verification is successful, is reported to the FW update controlling unit 520a (step S2207). On the other hand, in the case of determining in step S2205 that a pattern having a successful operation verification does not exist, the FW operation verifying unit 530a reports a verification failure to the FW update controlling unit 520a (step S2208).

[2.9 Example Operations Related to Updating Firmware by Gateway 300a and the Like]

Hereinafter, operations related to the updating of ECU firmware in the on-board network system 11 will be described.

Figure 24:
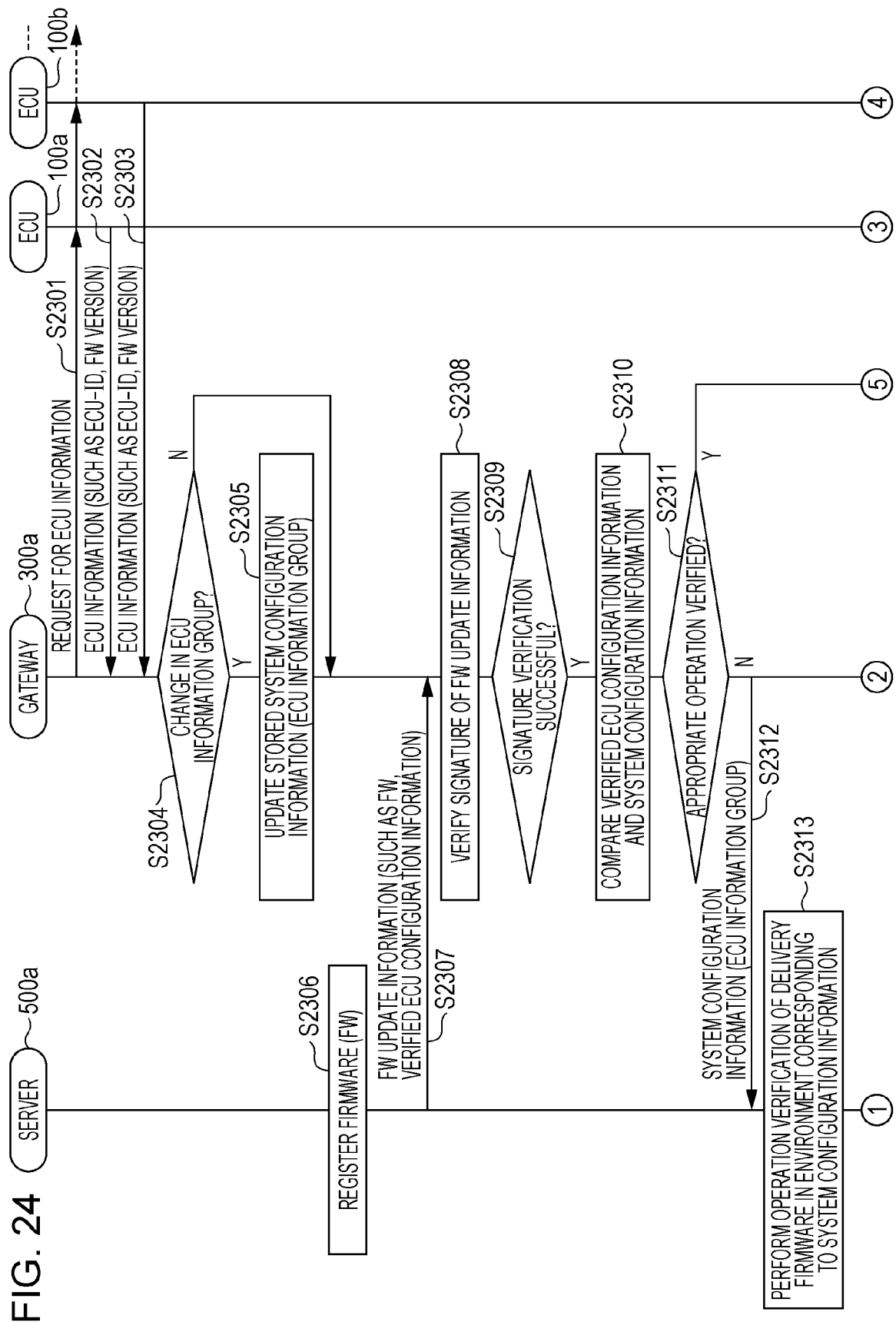
FIG. 24 is a sequence diagram illustrating example operations related to firmware updating according to Embodiment 2 (continuing to FIG. 25)
Figure 25:
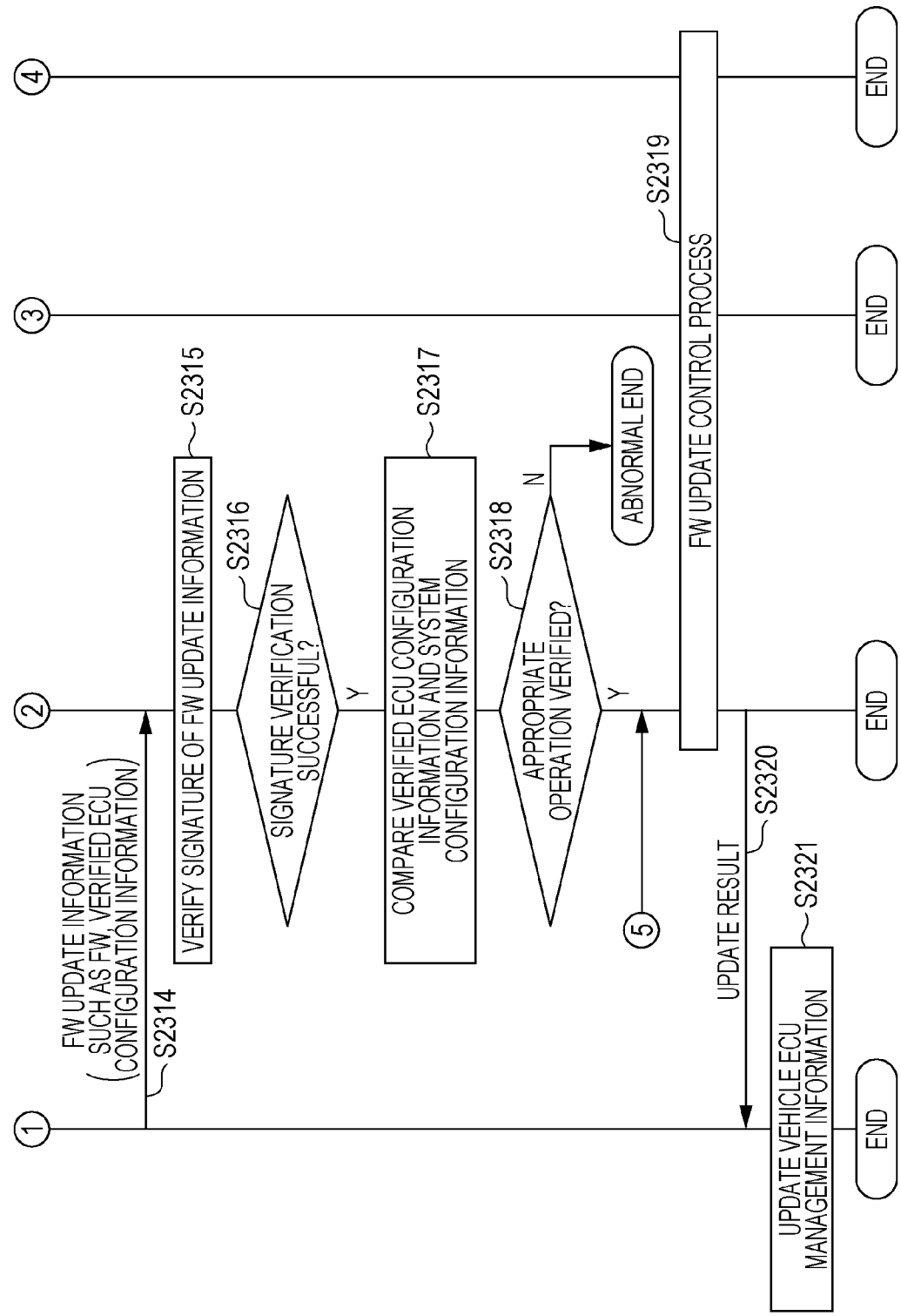
FIG. 25 is a sequence diagram illustrating example operations related to firmware updating according to Embodiment 2 (continuing from FIG. 24)

FIGS. 24 and 25 are sequence diagrams illustrating example operations related to the updating of ECU firmware conducted by the cooperation of devices such as the server 500a, the gateway 300a, and the ECUs 100a and 100b. Each sequence herein means the respective processing procedures (steps) in each device. Herein, a portion of ECU operations are illustrated for the sake of convenience. The sequences from step S2301 to S2304 illustrating the example operations are expected to be executed repeatedly on a cycle, such as every time a fixed number of days elapses, for example, but the sequences may also be executed when it is sensed that a new ECU has been added to the on-board network, or may be executed in correspondence with an operation by the driver or the like on any ECU inside the vehicle. Also, step S2306 and the steps thereafter are started in the case in which the server 500a receives a firmware registration request, for example.

Since the sequence from step S2301 to S2305 is the same as from step S1001 to S1005 described above (see FIG. 11), description is omitted herein. By the process from step S2301 to S2305, the gateway 300a is able to store system configuration information, that is, a set of the latest ECU information about each ECU connected to the on-board network (see FIG. 6) in the ECU information storing unit 372. Note that the process in step S2301 in which the gateway 300a transmits a frame for ECU information acquisition to request ECU information may also be omitted, and each ECU may be configured to transmit a frame including ECU information to the gateway 300a at a time such as during bootup, or when there is a change in the ECU's own ECU information (such as the ECU-ID or FW version).

In the case in which the latest (that is, updated) firmware for an ECU is uploaded to the server 500a and a firmware registration request is issued from a terminal device external to the server 500a (for example, a terminal device at the manufacturing company of the ECU or the like), the server 500a conducts a FW registration process (see FIG. 21) for registering the firmware (step S2306). With this arrangement, updated firmware is stored and managed in the FW storing unit 571 of the server 500a (in other words, registered in the server 500a) after an operation verification is performed in an environment using the ECU group for the corresponding vehicle model (a verification that the updated firmware operates appropriately without problems).

The server 500a generates FW update information including information such as the registered updated firmware and verified ECU configuration information indicating each ECU used in the operation verification of the firmware, and delivers the FW update information to the gateway 300a (step S2307). With this arrangement, the gateway 300a receives FW update information. Note that the delivery in step S2307 may be a transmission to the gateway 300a in one vehicle, or a transmission to the gateway 300a in each of multiple vehicles requiring a firmware update. Step S2307 is a receiving step, performed in the gateway 300a, that receives FW update information including updated firmware for updating at least one ECU from the server 500*a*.

After receiving the FW update information, the gateway 300*a* verifies the signature of the FW update information (FW update information signature) with the signature verifying unit 373 (step S2308). Subsequently, the FW update processing unit 370*a* of the gateway 300*a* determines whether or not the signature verification is successful (step S2309), and if the signature verification is unsuccessful, discards the FW update information. In this case, a firmware update based on the FW update information is not conducted.

In the case in which the signature verification is successful, the FW update processing unit 370*a* compares the verified ECU configuration information included in the FW update information to the system configuration information stored by the ECU information storing unit 372 (step S2310).

The FW update processing unit 370*a* of the gateway 300*a* determines whether or not an appropriate operation verification has been conducted, according to whether or not the comparison result between the type of each of the multiple ECUs provided on-board the vehicle and the types of each of the multiple ECUs used in the operation verification indicated by the verified ECU configuration information satisfies a certain condition (for example, whether or not the comparison result is an exact match) (step S2311). In the case in which the comparison result is an exact match, for example, the FW update processing unit 370*a* determines that an appropriate operation verification has been conducted. An operation verification of firmware using each ECU being used in a vehicle model is conducted when registering firmware in the server 500*a*, but in the vehicle provided with the gateway 300*a*, if an ECU of that vehicle model is replaced with a different ECU, or if an ECU is added, for example, the result of the comparison in step S2310 will no longer match.

In the case of determining that an appropriate operation verification has not been conducted, the gateway 300*a* transmits system configuration information expressing the organization of all ECUs connected to the on-board network as a set of ECU information stored by the ECU information storing unit 372 to the server 500*a* as an operation verification request (step S2312). Information related to the firmware delivered as an update is attached to the operation verification request, for example. Correspondingly, the server 500*a* receives the system configuration information and the like as an operation verification request. Step S2312 is an operation verification request transmitting step in which the gateway 300*a* transmits system configuration information to the server 500*a* that acts as an external device.

The server 500*a* receives the operation verification request, and the FW operation verifying unit 530*a* conducts a FW operation verification process regarding an operation verification of the delivered firmware in an environment corresponding to the system configuration information (step S2313). Step S2312 and step S2313 are an operation verifying step, performed in the server 500*a*, that receives system configuration information and conducts an operation verification of updated firmware using multiple ECUs of the same types as all of the types indicated by the system configuration information. Subsequently, after the operation verification of the firmware (after the firmware is confirmed to operate appropriately), the server 500*a* generates FW update information including verified ECU configuration information, which is information related to each ECU used in the operation verification in step S2313, and transmits the verified ECU configuration information to the gateway 300*a* of the single vehicle from which the transmission of the operation verification request originated (step S2314). Step S2314 is a firmware update information transmitting step that transmits FW update information after an operation verification is conducted. In the firmware update information transmitting step, verified ECU configuration information that indicates the type and the like of each of the multiple ECUs used in the operation verification may be included and transmitted with the FW update information. With this arrangement, the gateway 300*a* receives FW update information again.

After receiving the FW update information transmitted by the server 500*a* in step S2314, the gateway 300*a* verifies the signature of the FW update information (FW update information signature) with the signature verifying unit 373 (step S2315). The processing in steps S2315 to S2318 is similar to the processing in steps S2308 to S2311.

The gateway 300*a* determines whether or not an appropriate operation verification has been conducted (step S2318), according to whether or not a comparison result between each of the types of the ECUs indicated by the system configuration information and each of the types of the ECUs indicated by the verified ECU configuration information satisfy a certain condition (for example, whether or not the comparison result is an exact match), and in the case of determining that an appropriate operation verification has not been conducted, the gateway 300*a* conducts a certain abnormal handling process, and does not update the firmware.

In the case of determining in step S2318 or step S2311 that an appropriate operation verification has been conducted, the gateway 300*a*, mainly through the FW update processing unit 370*a*, conducts the FW update control process (see FIGS. 13 and 14) in cooperation with the ECU corresponding to the update target (step S2319). Steps S2317 to S2319 and the like is an update processing step in which the gateway 300*a* controls the updating of firmware in each relevant ECU based on updated firmware, after an operation verification of the updated firmware is performed using each type of ECU indicated by the system configuration information.

After the FW update control process in step S2319 ends, the gateway 300*a* transmits a firmware update result to the server 500*a* (step S2320). By this arrangement, the server 500*a* receives an update result. The firmware update result is information indicating whether or not the update is successful, for example, and this information may include a FW version related to the firmware after the update, for example, and may also include system configuration information, for example. Note that in the case in which signature verification fails in step S2309 or S2316, or in the case of determining in step S2318 that an appropriate operation verification has not been conducted, the gateway 300*a* may also transmit to the server 500*a* an update result indicating a firmware update failure.

In the case of receiving a firmware update result, the server 500*a* updates the vehicle ECU management information stored by the ECU management information storing unit 572 to indicate the updated state of the relevant firmware (step S2321).

[2.10 Firmware Operation Verification Environment]

Hereinafter, the simulation for firmware operation verification conducted by the simulator 800 used in the FW operation verification process by the FW operation verifying unit 530a of the server 500a will be described.

Figure 26:
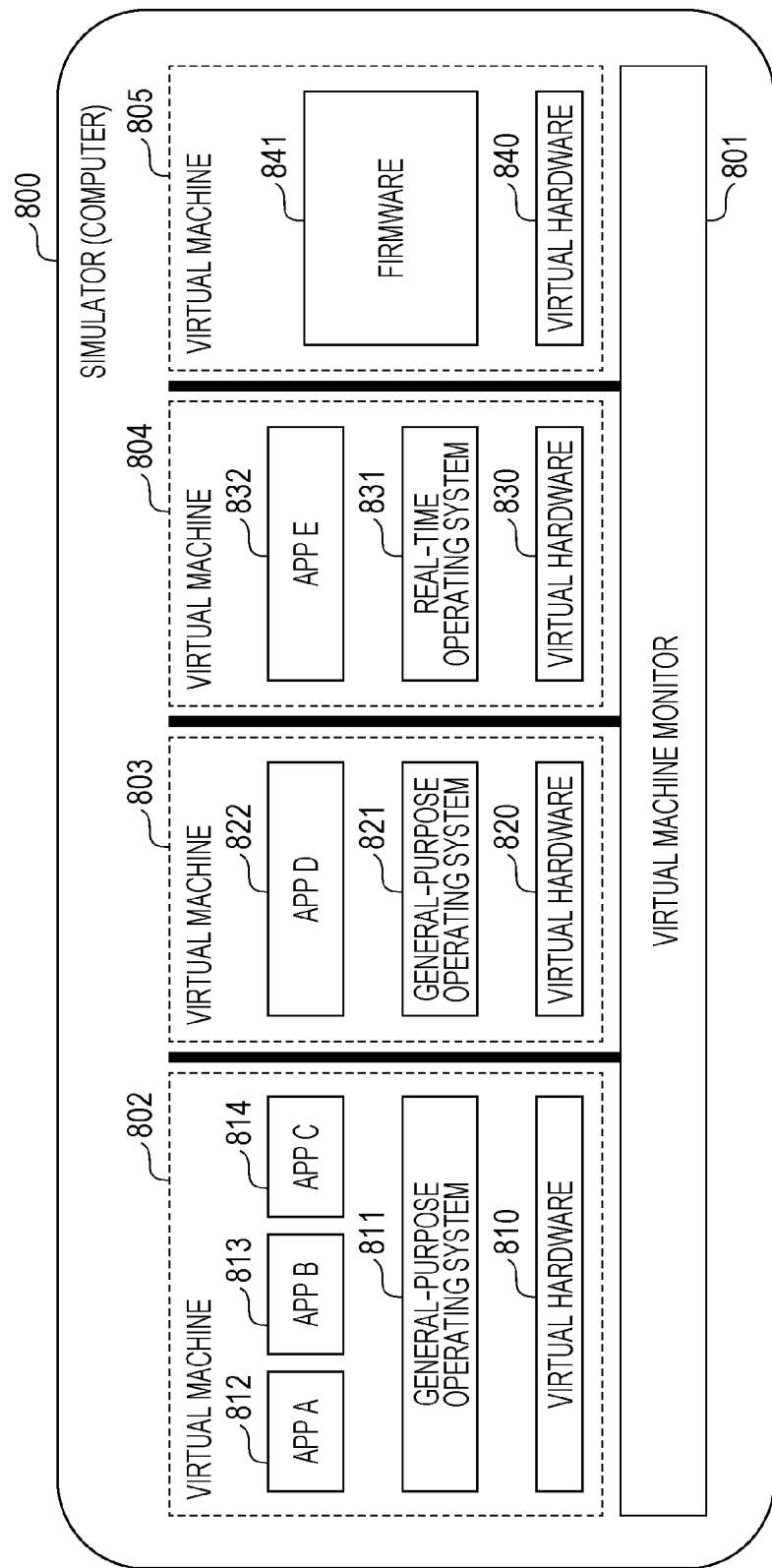
FIG. 26 is a diagram illustrating an example of a software configuration of a virtual environment by a simulator used in a FW operation verification process according to Embodiment 2.

FIG. 26 illustrates an example of a software configuration of a virtual environment used for firmware operation verification by the simulator 800 in the FW operation verification process.

As illustrated in the diagram, the software running on the simulator 800 includes a virtual machine monitor 801, virtual machines 802, 803, 804, and 805, virtual hardware 810, 820, 830, and 840, a general-purpose operating system (OS) 811 and 821, a real-time operating system (RTOS) 831, firmware 841, and application programs (apps) A 812, B 813, C 814, D 822, and E 832.

The simulator 800 is a computer that executes software (such as the virtual machine monitor 801) on a processor.

The virtual machine monitor 801 includes functions such as a virtual machine control function that controls the virtual machines 802 to 805 to run independently of each other, a resource management function that manages the allocation of hardware resources, such as memory and CPU, to the virtual machines, a device access function that accesses devices according to requests from the virtual machines, and a scheduling function that schedules the virtual machines.

Each of the virtual machines 802 to 805 is configured to include virtual hardware, an OS, apps, or firmware, and each is executed independently by the virtual machine monitor 801.

The virtual hardware 810, 820, 830, and 840 provides hardware functions virtually to each of the virtual machines, and may also include an initial program loader (IPL) and a basic input/output system (BIOS).

The general-purpose OS 811 includes a function of loading into memory and executing apps (app A 812, app B 813, and app C814), or a function of removing (unloading) each of the apps from memory, and also provides each of the apps with a network communication function according to the CAN protocol. The general-purpose OS 821 is also similar.

The RTOS 831 is an OS for running apps in which real-time performance is important.

The app A 812, app B 813, app C 814, app D 822, and app E 832 include various types of functions for automobiles, such as a car navigation function, a drive assist function, a steering control function, an engine control function, a brake control function, and a sensor information (such as torque, angle, velocity, and RPM) acquisition function. Each of these automotive function groups may be executed by a single app, or may be executed by multiple apps.

The firmware 841 is software for running functions that do not require an OS, or the like. Note that the firmware 841 may also include an OS, or include a function of becoming the operating environment of another app and controlling the execution of the other app.

Note that the number of apps running on the general-purpose OS 811, 821 or the RTOS 831 illustrated in FIG. 26 is merely one example, and a greater number of apps may also be run. In addition, the diagram illustrates a case in which there are two virtual machines on which a general-purpose OS is running, one virtual machine on which an RTOS is running, and one virtual machine on which firmware is running, but this is merely one example. A virtual environment may also be configured with just a virtual machine on which firmware is running, or may be configured with just a virtual machine on which firmware is running and a virtual machine on which an RTOS is running.

Additionally, in the simulator 800, a single ECU is simulated by a single virtual machine, such as one of the virtual machines 802 to 805 described above. For example, multiple virtual machines 805 (equal to the number of ECUs constituting the operating environment) may be generated and made to run on the virtual machine monitor 801, in which the hardware operation of a single ECU is simulated by the virtual hardware 840 of each virtual machine 805, and the firmware 841 has the same contents as the firmware implemented in that ECU, for example. For example, the virtual machine monitor 801 may be configured to simulate the bus-mediated communication between ECUs by communicating between the multiple virtual hardware configurations running on the virtual machine monitor 801.

In the case of setting each ECU constituting the operating environment for firmware operation verification, the FW operation verifying unit 530a sets up virtual machines in the simulator 800 to perform the same operations as each of the ECUs. At this time, the ECUs constituting the operating environment may also be set up by loading into the virtual machine monitor 801 a virtual machine already set up to simulate the operations of an ECU (in other words, a virtual ECU).

[2.11 Advantageous Effects of Embodiment 2]

In the on-board network system 11 according to Embodiment 2, in the case in which firmware is registered in the server 500a, an operation verification is conducted in advance, in an environment corresponding to the ECU configuration of the vehicle model. Subsequently, the server 500a delivers FW updated information, which includes verified ECU configuration information including information related to the ECUs used in the operation verification for the firmware registered via operation verification, as well as the firmware itself, to the gateway 300a of each vehicle. With this arrangement, firmware that has been subjected to an operation verification is delivered, and thus appropriate firmware updating in the ECUs of each vehicle becomes possible. Also, firmware for which operation verification fails is not registered in the server 500a, thereby reducing the possibility of delivering firmware that does not operate correctly. Also, since operation verification is conducted with an ECU configuration for each vehicle model, it becomes possible to verify in advance malfunctions or the like that occur only with specific vehicle models.

In addition, in the gateway 300a of a certain vehicle, the verified ECU configuration information in the received FW update information is compared to system configuration information, which is information about all ECUs inside the vehicle, to thereby confirm whether or not an operation verification related to the updating of firmware has been performed appropriately in an operating environment suited to that vehicle, and if an appropriate operation verification has not been performed, an operation verification request is issued to the server 500a. With this arrangement, before actually updating an ECU in a vehicle, it can be verified whether a firmware update would cause adverse effects. Subsequently, the gateway 300a is able to receive from the server 500a updated firmware on which an operation verification has been conducted in an operating environment suited to the vehicle. For this reason, in cases such as when an ECU provided on-board a vehicle experiences trouble and is replaced with a different ECU, or when an ECU is newly added, the gateway 300a is able to acquire firmware with verified operation, thereby making it possible to update ECU firmware appropriately. In other words, the possibility of the vehicle ceasing to function correctly after updating the firmware in the vehicle is reduced.

(Other Embodiments)

The above thus describes Embodiments 1 and 2 as illustrative examples of technology according to the present disclosure. However, the technology according to the present disclosure is not limited thereto, and is also applicable to embodiments obtained by the appropriate modification, substitution, addition, or removal of elements. For example, modifications like the following are also included as modes of the present disclosure.

(1) In the above embodiments, the gateway 300 or 300*a* that includes the external communication unit 375 (external communication function) communicates with the server 500 or 500*a* over the network 400 external to the vehicle, but this is merely one example. For example, the gateway 300 or 300*a* may also communicate with the server 500 or 500*a* via a separate ECU (such as a head unit, for example) having a function of communicating with external equipment. The head unit is a type of ECU provided with a comparatively powerful processor, and is a device that includes a display device such as a liquid crystal display provided on the instrument panel (IP) of an automobile, and may report information to the driver of the vehicle. Note that some on-board networks have a diagnostic port called On-Board Diagnostics 2 (OBD2) or the like, which is an interface that communicates with an external device such as a diagnostic tool, and which is used to diagnose ECUs. Accordingly, the gateway 300 or 300*a* may also communicate with an external device which is able to communicate with the server 500 or 500*a* and which is also connected to the diagnostic port, and thereby communicate with the server 500 or 500*a* indirectly, for example. In these cases, the gateway 300 or 300*a* does not necessarily need to include an external communication function for communicating with equipment external to the vehicle, and the transmission of an operation verification request or FW update request in association with system configuration information or the like, as well as the exchange of FW update information or the like becomes possible between the gateway 300 or 300*a* and the server 500 or 500*a* via another ECU or an external device.

(2) The foregoing embodiments indicate an example in which the FW version indicating a version number or the like of the firmware for each ECU is managed by the server 500 or 500*a* and the gateway 300 or 300*a*, but the FW version may also be managed in a different ECU or in another piece of equipment, such as a diagnostic tool.

(3) In the above embodiments, an on-board network is illustrated as an example of a network communication system that communicates in accordance with the CAN protocol. The technology according to the present disclosure is not limited to an on-board network, and is also applicable to network communication systems that communicate according to the CAN protocol besides an on-board network, such as a network for a robot, industrial equipment, or the like. Also, the CAN protocol should be construed in a broad sense, and also encompasses derivative protocols such as CANopen used in embedded systems inside automation systems, time-triggered CAN (TTCAN), and CAN with flexible data rate (CANFD). Also, the above embodiments illustrate an example of transmitting and receiving data (frames) related to firmware between buses based on the CAN protocol, but another protocol may also be applied, and an arbitrary communication link and communication scheme may be used to communicate data related to firmware.

(4) In the above embodiments, to ensure the integrity of data (such as FW data and FW update information), a configuration in which a signature is attached to the data is used, but the data additionally may be encrypted to ensure confidentiality. The key used for the signature and the key used for the encryption may also be separate keys.

(5) In the above embodiments, the same key is used when generating the signature for the FW update information and when generating the signature for the FW data, but a separate key for each may also be used. For example, the signature for the FW update information as the delivery data as a whole (FW update information signature) may be generated using a key held by the automobile manufacturer, whereas the signature for the individual FW data (FW data signature) may be generated used a key held by the manufacturing company of the ECU implementing the firmware according to that FW data (or alternatively, the manufacturing company of that firmware). Note that although the foregoing embodiments illustrate an example in which each ECU verifies the FW data signature, the gateway 300 or 300*a* may also store verification keys in advance and verify the FW data signature, without having each ECU verify the FW data signature.

(6) In the foregoing Embodiment 2, in the case in which updating multiple pieces of firmware is necessary, the gateway 300*a* receives information related to an order in which to update firmware (update sequence information) that the server 500*a* includes in the FW update information, and updates by the following the order indicated by the update sequence information, but the gateway 300*a* may also not necessarily perform updating in the order of the update sequence. Also, the server 500 in Embodiment 1 may include and transmit update sequence information in the FW update information, and the gateway 300 may transmit FW data in step S1204 in an order following the update sequence information to thereby cause firmware to be updated in order.

(7) Part of the processing by the server 500 or 500*a* according to the foregoing embodiments may also be executed by another device (such as a computer) distant from the server 500 or 500*a*, but communicable with the server 500 or 500*a*.

(8) In the server 500 or 500*a* according to the foregoing embodiments, in the case in which the operation verification of firmware fails, information related to the organization of ECUs (combination of ECUs) constituting the operating environment (malfunction information) may also be managed. In this case, the server 500 or 500*a* reports the malfunction information to the gateway 300 or 300*a*, and the gateway 300 or 300*a* becomes able to determine that firmware should not be updated in the case in which the ECU configuration inside the vehicle matches the configuration indicated by the malfunction information.

(9) In the foregoing embodiments, in the case of updating multiple pieces of firmware, the FW operation verifying unit 530 generates verification sequence patterns and records a verification sequence for which operation verification is successful. However, the configuration is not limited thereto, and the FW operation verifying unit 530 may also update and conduct operation verification on multiple pieces of firmware at the same time, or in the case in which operation verification fails for all verification sequence patterns, generate patterns of simultaneous verification and conduct operation verification.

(10) The foregoing Embodiment 2 indicates, as an example of the gateway 300*a* determining whether or not an appropriate operation verification of firmware has been conducted, an example of determining whether or not a comparison result between the type of each of the multiple ECUs provided on-board a vehicle as indicated by the system configuration information and the type of each of the multiple ECUs used in the operation verification as indicated by the verified ECU configuration information satisfies a certain condition, such as an exact match, for example. However, this is merely one example, and a method may also be used in which an appropriate operation verification is treated as having been conducted in the case in which the types of all ECUs indicated by the system configuration information are included among the types of multiple ECUs used in the operation verification indicated by the verified ECU configuration information, for example. Correspondingly, a method may also be used in which an appropriate operation verification is treated as having been conducted in the case in which the verified ECU configuration information indicates the same types of ECUs as all of the types of ECUs indicated by the system configuration information. Additionally, for example, in the case in which the FW update processing unit 370a of the gateway 300a confirms that the verified configuration information does not indicate the same types as all of the types indicated by the system configuration information, the FW update processing unit 370a may deter updating based on the updated firmware included in the FW update information, and control the transmission of system configuration information as an operation verification request to the server 500a that acts as an external device.

(11) In the foregoing embodiments, an example is indicated in which the type of an ECU is specifiable from the ECU-ID (ECU identification information) and the FW version (firmware version identification information), but that which is specified by the ECU-ID alone may also be prescribed as the type of an ECU. Note that although an example is indicated in which the ECU-ID is information that distinguishes individual ECUs while also enabling the type of ECU to be discriminated, the ECU-ID may also be information that distinguishes types of ECUs, but does not enable the individual ECUs themselves to be distinguished from one another.

(12) In the FW operation verifying unit 530 of the server 500 indicated in Embodiment 1 above, the firmware operation verification by the simulator 800 indicated in Embodiment 2 above may also be conducted. Also, besides having the server 500 or 500a conduct the operation verification of updated firmware using ECUs of the same type as each ECU connected to the on-board network in a certain vehicle (in other words, an ECU of each type indicated by the system configuration information), a method may also be used in which the gateway 300 or 300a of that vehicle conducts the operation verification. In other words, the gateway 300 or 300a may be provided with a simulation unit that includes a simulator similar to the simulator 800 indicated in Embodiment 2, and the gateway 300 or 300a itself may conduct an operation verification of firmware received from the server 500 or 500a in an operating environment that simulates ECUs of each type indicated by the system configuration information. In this case, the gateway 300 or 300a causes the ECU corresponding to the update target to perform a firmware update after first verifying that the firmware operates without problems. For example, in the case in which the FW update processing unit 370a of the gateway 300a confirms that the verified configuration information does not indicate the same types as all of the types indicated by the system configuration information, the FW update processing unit 370a may cause the simulation unit in the gateway 300a to perform a simulation of the operation of the updated firmware using respective ECUs of the same types as all of the types indicated by the system configuration information, and control an update based on the updated firmware after an operation verification is performed by the simulation. Note that in the case in which the gateway 300 or 300a conducts the firmware operation verification, the gateway 300 or 300a may be configured to transmit messages (frames) actually received from the on-board network to an on-board network inside the operating environment (virtual environment) constructed by the simulator. In this case, messages received by the gateway 300 or 300a may be transmitted from a virtual machine (virtual ECU) that does not execute updated firmware in the virtual environment. Also, each of the one or more ECUs which are firmware update targets may be realized as a virtual machine that operates in a computer with a configuration like that of the simulator 800.

(13) The updated firmware (binary data) illustrated in the above embodiments may be all or part of the firmware to be implemented in the ECU. In the case in which the updated firmware is part of the firmware to be implemented in the ECU, part of the existing firmware inside the ECU is overwritten. In this case, the updated firmware may be configured to include patch data (binary data), and information indicating where to apply the patch (such as address information, for example). In this case, the patch data and the existing firmware first may be merged in the gateway 300 or 300a, or the ECU corresponding to the update target, and then used to replace the firmware in the boot ROM of the ECU.

(14) The execution order of the steps in the various processes illustrated in the above embodiments (such as certain steps illustrated in FIGS. 11 to 14 and FIGS. 21 to 25, for example) is not necessarily limited to the order given above, and within a scope that does not depart from the gist of the disclosure, it is possible to rearrange the execution order, perform multiple steps in parallel, or skip some steps.

(15) The gateway 300 or 300a and other ECUs in the above embodiments are taken to be devices including components like digital circuits, such as a processor and memory, analog circuits, and communication circuits, but may also include other hardware structural elements, such as a hard disk device, a display, a keyboard, and a mouse. Additionally, instead of realizing functions in software by having a processor execute a control program stored in memory, such functions may also be realized by special-purpose hardware (such as digital circuits).

(16) Some or all of the structural elements constituting each device in the above embodiments may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is recorded in the RAM. The system LSI chip achieves the functions thereof as a result of the microprocessor operating in accordance with the computer program. In addition, the respective units of the structural elements constituting each of the above devices may be realized individually as separate chips, or as a single chip that includes some or all structural elements. Also, although system LSI is discussed herein, the circuit integration methodology may also be referred to as IC, LSI, super LSI, or ultra LSI, depending on the degree of integration. Furthermore, the circuit integration methodology is not limited to LSI, and may be also be realized with special-purpose circuits or general-purpose processors. A field-programmable gate array (FPGA) capable of being programmed after fabrication, or a reconfigurable processor whose circuit cell connections and settings may be reconfigured, may also be used. Furthermore, if circuit integration technology that may be substituted for LSI appears as a result of progress in semiconductor technology or another derived technology, obviously the new technology may be used to integrate the function blocks. Biotechnology applications and the like are also a possibility.

(17) Some or all of the structural elements constituting each of the above devices may also be configured as an IC card or a separate module that may be inserted into each device. The IC card or the module is a computer system made up of components such as a microprocessor, ROM, and RAM. The IC card or the module may also include the advanced multi-function LSI chip discussed above. The IC card or the module achieves the functions thereof as a result of the microprocessor operating in accordance with the computer program. The IC card or the module may also be tamper-resistant.

(18) One aspect of the present disclosure may be a firmware update method that includes all or part of the processing steps illustrated in FIGS. 11, 12, 24, and 25, for example. In addition, this method may be taken to be a computer program (control program) realized by a computer, or a digital signal containing the computer program. For example, the computer program may be a control program for executing a firmware update process including the receiving step, the acquiring step, and the update processing step in the firmware update method. In addition, one aspect of the present disclosure may be realized by recording the computer program or the digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example. In addition, one aspect of the present disclosure may also be taken to be the digital signal recorded on these recording media. In addition, one aspect of the present disclosure may also be realized by transmitting the computer program or the digital signal over an electrical communication link, a wired or wireless communication link, a network such as the Internet, or a data broadcast. In addition, one aspect of the present disclosure may also be a computer system equipped with a microprocessor and memory, in which the memory records the above computer program, and the microprocessor operates according to the computer program. In addition, one aspect of the present disclosure may also be carried out by another independent computer system by recording and transporting the program or the digital signal on a recording medium, or transporting the program or the digital signal over a medium such as a network.

(19) Embodiments realized by arbitrarily combining the respective structural elements and functions indicated in the above embodiments and the above modifications are also included in the scope of the present disclosure.

The present disclosure is usable to suitably conduct a firmware update on an ECU connected to an on-board network conforming to CAN.

What is claimed is:

1. A gateway device connected to a bus used in communication by a plurality of electronic control units provided on-board a vehicle, the gateway device comprising:
processing circuitry; and
storage including at least one set of instructions that, when executed by the processing circuitry, cause the processing circuitry to perform operations including
receiving, from an external device external to the vehicle, firmware update information that includes updated firmware for one electronic control unit from among the plurality of electronic control units,
acquiring system configuration information indicating a function of each of the plurality of electronic control units connected to the bus, wherein the function of each of the plurality of electronic control units is related to exchange of data via the bus, and
performing a controlling operation to update firmware of the one electronic control unit, for which updated firmware is received by the receiving, on a basis of the updated firmware, after an operation verification of the updated firmware is performed in an operating environment appropriately, the operating environment being configured with electronic control units of the same functions as each of the electronic control units indicated by the system configuration information.

2. The gateway device according to claim 1, wherein the firmware update information further includes verified configuration information indicating the function of each of the plurality of electronic control units used in the operating environment during the operation verification of the updated firmware, and
the controlling operation includes
comparing the function of each of the plurality of electronic control units provided on-board the vehicle as indicated by the system configuration information to the function of each of the plurality of electronic control units used in the operating environment during the operation verification as indicated by the verified configuration information, and
performing an update based on the updated firmware in a case of confirming that the same functions as all of the functions indicated by the system configuration information are indicated by the verified configuration information.

3. The gateway device according to claim 2, wherein the function of each of the plurality of electronic control units connected to the bus as indicated by the system configuration information is identifiable from a version of firmware implemented in each electronic control unit connected to the bus, and
the function of each of the plurality of electronic control units used in the operating environment during the operation verification of the updated firmware as indicated by the verified configuration information is identifiable from a version of firmware implemented in each electronic control unit used in the operating environment during the operation verification.

4. The gateway device according to claim 1, wherein the operations additionally include
transmitting the system configuration information to the external device, and
the controlling operation includes
if the received firmware update information has been transmitted after the external device references the system configuration information and conducts the operation verification of the updated firmware in the operating environment, performing an update based on the updated firmware of the firmware update information.

5. The gateway device according to claim 4, wherein the system configuration information includes, for each of the plurality of electronic control units connected to the bus, identification information regarding each electronic control unit and identification information regarding a version of firmware implemented in each electronic control unit for specifying the function of each of the plurality of electronic control units.

6. The gateway device according to claim 1, wherein the operations additionally include
transmitting the system configuration information to the external device,
the firmware update information includes verified configuration information indicating the function of each of the plurality of electronic control units used in the operating environment during the operation verification of the updated firmware, and
the controlling operation includes
in a case of confirming that the same functions as all of the functions indicated by the system configuration information are not indicated by the verified configuration information, deterring an update based on the updated firmware, and transmitting the system configuration information to the external device.

7. The gateway device according to claim 1, wherein
the firmware update information includes verified configuration information indicating the function of each of the plurality of electronic control units used in the operating environment during the operation verification of the updated firmware, and
the controlling operation includes
in a case of confirming that the same functions as all of the functions indicated by the system configuration information are not indicated by the verified configuration information, executing a simulation of operation of the updated firmware using respective electronic control units of the same functions as all of the functions indicated by the system configuration information, and after operation verification is performed by the execution of the simulation, performing an update based on the updated firmware.

8. The gateway device according to claim 1, wherein
the controlling operation includes
executing a simulation of operation of the updated firmware using respective electronic control units of the same functions as all of the functions indicated by the system configuration information, and after operation verification is performed by the execution of the simulation, performing an update based on the updated firmware.

9. The gateway device according to claim 1, wherein
the plurality of electronic control units connected to the bus communicate over the bus in accordance with a controller area network (CAN) protocol, and
the controlling operation includes
transmitting the updated firmware to the one electronic control unit, for which updated firmware is received, over the bus.

10. A method comprising:
receiving, by a gateway device connected to a bus used for communication by a plurality of electronic control units provided on-board a vehicle, from an external device external to the vehicle, firmware update information that includes updated firmware for one electronic control unit from among the plurality of electronic control units;
acquiring, by the gateway device, system configuration information indicating a function of each of the plurality of electronic control units connected to the bus, wherein the function of each of the plurality of electronic control units is related to exchange of data via the bus; and
performing, by the gateway device, a controlling operation to update firmware of the one electronic control unit for which updated firmware is received, on a basis of the updated firmware, after an operation verification of the updated firmware is performed in an operating environment appropriately, the operating environment being configured with electronic control units of the same functions as each of the electronic control units indicated by the system configuration information.

11. The method according to claim 10, further comprising:
executing, by the external device, an operation verification of the updated firmware using a plurality of electronic control units; and
transmitting, by the external device, verified configuration information indicating a function of each of the plurality of electronic control units used in the execution of the operation verification in the operating environment, the verified configuration information being included in the firmware update information, wherein
the controlling operation includes
comparing the function of each of the plurality of electronic control units provided on-board the vehicle as indicated by the system configuration information to the function of each of the plurality of electronic control units used in the operating environment during the operation verification as indicated by the verified configuration information, and
performing an update based on the updated firmware in a case of confirming that the same functions as all of the functions indicated by the system configuration information are indicated by the verified configuration information.

12. The method according to claim 10, further comprising:
transmitting, by the gateway device, to the external device, the system configuration information;
receiving, by the external device, the system configuration information;
executing, by the external device, an operation verification of the updated firmware in the operating environment using a plurality of electronic control units of the same functions types as all of the functions types indicated by the received system configuration information; and
transmitting, by the external device, the firmware update information after the execution of the operation verification, wherein
the controlling operation additionally includes
performing an update based on the updated firmware in a case of receiving the firmware update information after the transmission of the system configuration information.

13. A non-transitory computer-readable recording medium storing a program that, when executed by a processor provided in a gateway device connected to a bus used for communication by a plurality of electronic control units provided on-board a vehicle, causes the processor to execute a method comprising:
receiving, from an external device external to the vehicle, firmware update information that includes updated firmware for one electronic control unit from among the plurality of electronic control units;
acquiring system configuration information indicating a function of each of the plurality of electronic control units connected to the bus, wherein the function of each of the plurality of electronic control units is related to exchange of data via the bus; and
performing a controlling operation to update firmware of the one electronic control unit for which updated firmware is received, on a basis of the updated firmware, after an operation verification of the updated firmware is performed in an operating environment appropriately, the operating environment being configured with electronic control units of the same functions as each of the electronic control units indicated by the system configuration information.

\* \* \* \* \*